(12) United States Patent
Mueller

(10) Patent No.: US 11,928,096 B2
(45) Date of Patent: Mar. 12, 2024

(54) SYSTEMS AND METHODS USING GENERIC DATABASE SEARCH MODELS

(71) Applicant: SAP SE, Walldorf (DE)

(72) Inventor: Thomas Mueller, Walldorf (DE)

(73) Assignee: SAP SE, Walldorf (DE)

(*) Notice: Subject to any disclaimer, the term of this patent is extended or adjusted under 35 U.S.C. 154(b) by 0 days.

(21) Appl. No.: 17/124,187

(22) Filed: Dec. 16, 2020

(65) Prior Publication Data

US 2022/0188284 A1 Jun. 16, 2022

(51) Int. Cl.
*G06F 16/901* (2019.01)
*G06F 16/22* (2019.01)
*G06F 16/242* (2019.01)
*G06F 16/25* (2019.01)

(52) U.S. Cl.
CPC ........ *G06F 16/2282* (2019.01); *G06F 16/221* (2019.01); *G06F 16/2423* (2019.01); *G06F 16/258* (2019.01); *G06F 16/9024* (2019.01)

(58) Field of Classification Search
CPC .. G06F 16/2282; G06F 16/221; G06F 16/258; G06F 16/2423; G06F 16/9024
USPC ........................................................ 707/769
See application file for complete search history.

(56) References Cited

U.S. PATENT DOCUMENTS

| | | | | |
|---|---|---|---|---|
| 10,922,493 | B1* | 2/2021 | Das | G06N 20/10 |
| 11,003,662 | B2* | 5/2021 | Mathur | G06F 16/2272 |
| 11,341,321 | B2* | 5/2022 | Owens | G06F 40/186 |
| 2004/0031015 | A1* | 2/2004 | Ben-Romdhane | G06F 8/75 |
| | | | | 717/107 |
| 2005/0033719 | A1* | 2/2005 | Tirpak | G06F 16/25 |
| 2006/0122993 | A1* | 6/2006 | Dettinger | G06F 16/24549 |
| 2006/0173873 | A1* | 8/2006 | Prompt | G06F 16/284 |
| 2008/0126055 | A1* | 5/2008 | Jain | G06Q 10/067 |
| | | | | 703/13 |
| 2008/0281801 | A1* | 11/2008 | Larson | G06F 16/284 |
| 2012/0227077 | A1* | 9/2012 | Spivack | G06F 16/9535 |
| | | | | 345/173 |
| 2013/0346422 | A1* | 12/2013 | Jordahl | G06F 16/24578 |
| | | | | 707/769 |
| 2014/0172914 | A1* | 6/2014 | Elnikety | G06F 16/9024 |
| | | | | 707/774 |

(Continued)

OTHER PUBLICATIONS

Batarfi et al., A distributed query execution engine of big attributed graphs, 2016, SpringerPlus, all pages. (Year: 2016).*
"Communication—Extended European Search Report" from the European Patent Office for European Application No. EP21210638.9-1203, dated May 4, 2022, 10 pages.

(Continued)

*Primary Examiner* — Amy Ng
*Assistant Examiner* — Antonio J Caiado
(74) *Attorney, Agent, or Firm* — Klarquist Sparkman, LLP

(57) ABSTRACT

A computer system includes one or more database search models configured to search data contained in a plurality of database tables. The one or more database search models can include a plurality of structural containers and one or more search enabling containers. The plurality of structural containers can represent objects having a structural relationship and contain property data of the objects. The property data of the objects can be obtained from the plurality of database tables. The plurality of structural containers can be shared by the one or more database search models. The one or more search enabling containers can correspond to the one or more database search models and specify a scope for searching data and a format for presenting search results.

20 Claims, 8 Drawing Sheets

(56) References Cited

U.S. PATENT DOCUMENTS

| | | | |
|---|---|---|---|
| 2014/0279834 A1* | 9/2014 | Tsirogiannis | G06F 16/254 |
| | | | 707/602 |
| 2016/0048584 A1* | 2/2016 | Valentin | G06F 16/332 |
| | | | 707/770 |
| 2016/0335371 A1* | 11/2016 | Rao | G06F 16/214 |
| 2017/0132277 A1* | 5/2017 | Hsiao | G06F 16/2425 |
| 2018/0004825 A1* | 1/2018 | Beard | G06F 16/2455 |
| 2020/0301937 A1* | 9/2020 | Shankar | G06F 16/242 |
| 2020/0334237 A1* | 10/2020 | Yousaf | G06F 16/248 |
| 2021/0192375 A1* | 6/2021 | Xia | G06N 20/00 |
| 2021/0312919 A1* | 10/2021 | Sato | G06F 16/3329 |

OTHER PUBLICATIONS

Meyer et al., "The Hydra.PowerGraph System, Building Digital Archives with Directed and Typed Hypergraphs," Datenbank-Spektrum, Dpunkt Verlag, Heidelberg, DE, vol. 17, No. 2, pp. 113-129, Jun. 21, 2017.
Thomas Mueller, "CDS-based Search Models, A Short Summary," SAP, Jul. 17, 2020, 5 pages.
Screenshots of transaction ESH_Modeler from the user interface of "Modeler for Search and Analytics" (available to SAP customers) taken on Oct. 16, 2020, 8 pages.
"Enterprise Search," https://help.sap.com/viewer/5d7d37af2a864fe794217870461 4e3ec/201909,002/en-US, 76 pages, generated Oct. 19, 2020.
"Enterprise Search: Developer's Guide," https://help.sap.com/viewer/5d7d37af2a864fe79421787079 14e3ec/201909.002/en-US, 43 pages, generated Oct. 19, 2020.

* cited by examiner

SYSTEMS AND METHODS USING GENERIC DATABASE SEARCH MODELS

BACKGROUND

The amount of data in enterprise systems continues to increase at a high pace. Enterprise search software can allow authorized users to find applications and logical data objects stored in an enterprise system and/or databases. Ideally, such an enterprise search solution can provide a unified, comprehensive, and secure real-time access to enterprise data and information within and outside a company. Desirably, the search should be able to return both structured data (e.g., logical data objects) and unstructured data (e.g., HTML files, presentations, documents, etc.) from the enterprise system and/or databases and allow direct access to the associated applications and actions. Although tremendous progress has been in the past decades on enterprise search, there is room for improvement.

DETAILED DESCRIPTION

Example 1—Overview of Database Search Models

Figure 1:
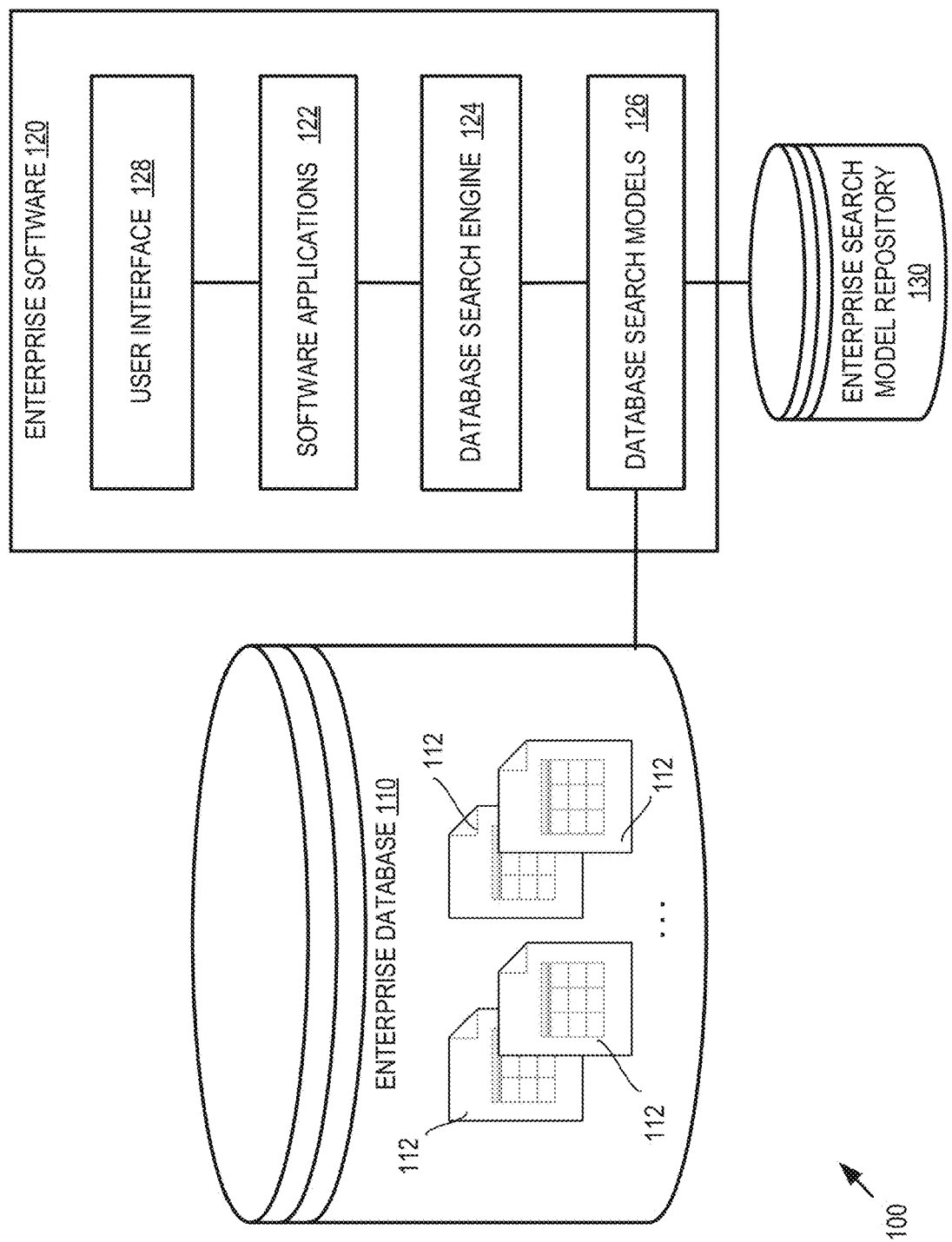
FIG. 1 is an overall block diagram of an example enterprise system incorporating database search models for searching an enterprise database.

The ever-increasing amount of incoming data and transformation of the enterprise into a data-driven world creates many difficulties as data is indeed accumulated. In particular, accessing and finding relevant data by searching is a key component of modern data usage.

Some enterprise search solutions replicate the enterprise database in a separate database and search logical data objects within the replicated database. While they may reduce or avoid additional system load on the source system at the time of search, preprocess/prepare/edit/adjust search-relevant data, and enable a search on data which have been deleted already, the replication-based search solutions are associated with some shortcomings. For example, the search results may be outdated, the replication process may have to be triggered repeatedly, there may be increased system load on the source system at the time of replication, and there may be significant additional memory consumption for storing the replicated data.

On the other hand, some enterprise search solutions can be accomplished through search models using a replication-free approach, e.g., search calls can be executed based on the original business data stored in the enterprise database. The search models, which can embrace most or all information necessary to execute a successful search, can be used to realize the actual search. For example, such information can include one or more request fields (e.g. in which columns a search term should or could be found), one or more response fields (e.g. which columns should be a part of the search result), etc., as described further below.

A search model can include many different searches of many different types, which can work together, either directly, indirectly (e.g. by subject matter or conceptually). Search models can be provided in integrated development environments, data management software, data integration software, enterprise resource planning software, database or database management systems, or other code or search analysis software systems. For example, search models have been used by the SAP Enterprise Search™ technology, SAP NetWeaver Application Server™ technology, SAP S/4HANA™ technology, SAP S/4HANA Cloud™ technology, SAP S/4HANA On Premise™ technology, all by SAP SE of Walldorf, Germany.

As described below, a search model can include both structural information about objects (e.g., property data of the objects and relationship between the objects) and information specific to data search (e.g., the scope of data search and the format of search results). While certain database search models (also referred to as "hierarchical database search models") can capture the structural relationship between objects in a hierarchical representation and embed search-specific information within such hierarchical representation, some search models (also referred to as "generic database search models") can provide a generic representation of objects and keep the structural aspects and search specifics separate and independent from each other. As explained below, generic database search models can be easier for creation, maintenance, and update compared to hierarchical search models.

Example 2—Example Overview of An Enterprise System Supporting Database Search Models FIG. 1 shows an overall block diagram of an example enterprise system 100 supporting any of the database search models described herein.

As shown, the enterprise system 100 includes enterprise software 120, such as an enterprise resource planning (ERP) software, which may interact and/or communicate with an enterprise database 110. The enterprise software 120 can be installed locally (e.g., on a company's own computers and servers) or hosted remotely on a cloud (e.g., on a vendor's servers and accessed through a web browser). The enterprise database 110 can include a plurality of database tables 112 containing data pertaining to a variety of logical data objects (e.g., employees, inventories, products, etc.). In certain embodiments, the enterprise database 110 is a relational database where relationships between database tables 112 can be established by foreign keys. In other embodiments, the enterprise database 110 can be a non-relational database where data is stored in a non-tabular form.

The enterprise software 120 can run one or more software applications 122, some of which can be configured to perform data search in the enterprise database 110. The enterprise software 120 can have a user interface 128 through which a user can enter a search request, which can specify search terms and/or search criteria.

In some embodiments, the software applications 122 can search the enterprise database 110 through a database search engine 124. The database search engine 124 can utilize database search models 126 to perform replication-free searches of the enterprise database 110. As described below, the database search models 126 can characterize the structural relationships between the logical data objects and specify search specific information, such as the scope of data search and the format of search results. In certain embodiments, the database search models 126 can be stored in an enterprise search model repository 130, which can be retrieved by the enterprise software 120.

The database search models 126 can be organized into database search engine 124 or other search software components, which, among other things, can serve as a transport vehicle. These software components can be transported between systems to deliver new or corrected database search models to customers, or to transfer customer-specific database search models from development systems to test or production systems.

In practice, the systems shown herein, such as system 100, can vary in complexity, with additional functionality, more complex components, and the like. For example, there can be additional functionality within the database search engine 124. Additional components can be included to implement security, redundancy, load balancing, report design, and the like.

The described computing systems can be networked via wired or wireless network connections, including the Internet. Alternatively, systems can be connected through an intranet connection (e.g., in a corporate environment, government environment, or the like).

The system 100 and any of the other systems described herein can be implemented in conjunction with any of the hardware components described herein, such as the computing systems described below (e.g., processing units, memory, and the like). In any of the examples herein, the database search models (including components of the search models), the search requests, the search results, and the like can be stored in one or more computer-readable storage media or computer-readable storage devices. The technologies described herein can be generic to the specifics of operating systems or hardware and can be applied in any variety of environments to take advantage of the described features.

Example 3—Example Overall Method of Data Search Using Database Search Models

Figure 2:
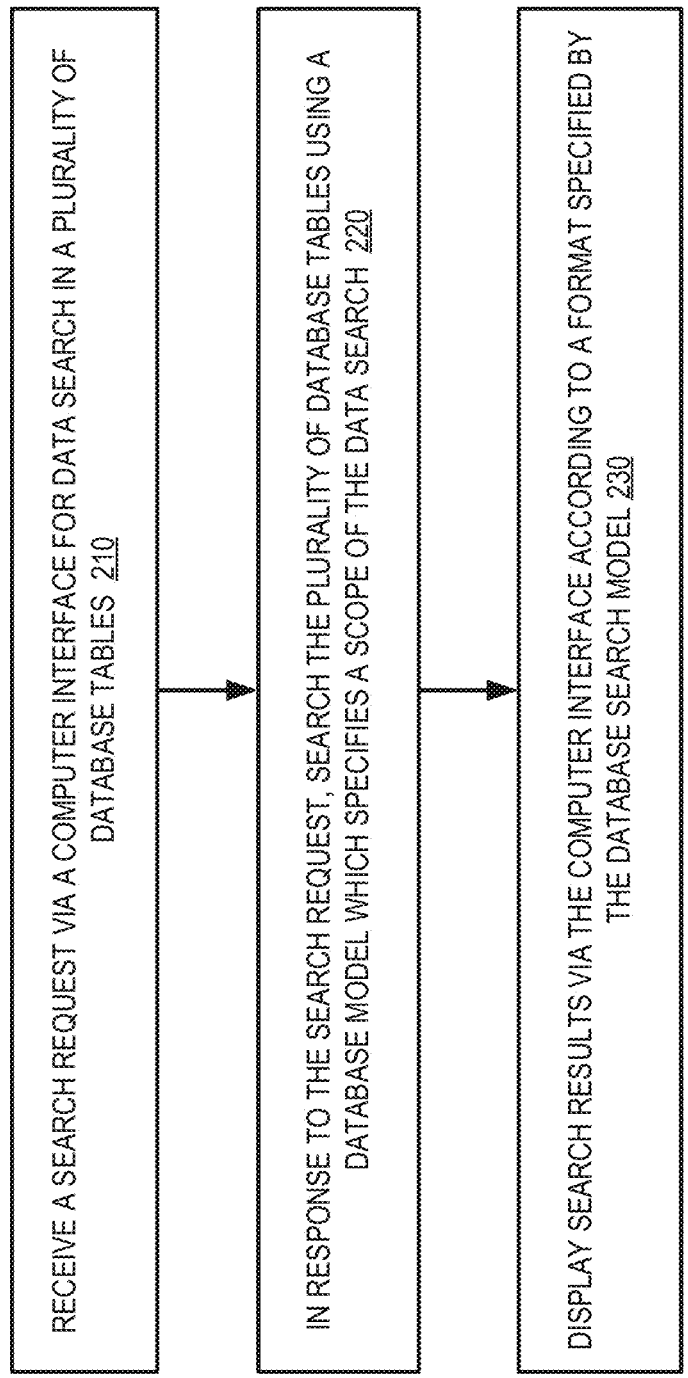
FIG. 2 is a flowchart illustrating an example overall method of searching data in database tables.

FIG. 2 is a flowchart of an example overall method 200 of performing data search in a database, for example, by the system of FIG. 1.

At 210, a search request can be received via a computer interface (e.g., 128) for data search in a plurality database tables (e.g., 112) maintained by the database. At 220, in response to the search request, a corresponding database search model (e.g., 126) can be used to search the plurality of database tables and the database search model specifies a scope of the data search. At 230, the search results can be displayed via the computer interface according to a format specified by the database search model. Example embodiments of database search models are described further below.

The method 200 and any of the other methods described herein can be performed by computer-executable instructions (e.g., causing a computing system to perform the method) stored in one or more computer-readable media (e.g., storage or other tangible media) or stored in one or more computer-readable storage devices. Such methods can be performed in software, firmware, hardware, or combinations thereof. Such methods can be performed at least in part by a computing system (e.g., one or more computing devices).

The illustrated actions can be described from alternative perspectives while still implementing the technologies. For example, "receive" can also be described as "send" from a different perspective.

Example 4—Example Database Tables

As described herein, a database search model defines properties that a data source needs in order to be used in enterprise search scenarios. Database search models can represent corresponding objects of a business entity. Properties of the objects can be imported from respective database tables. Structural relationship between the objects can be modelled based on relationship between the database tables. For purposes of illustration, the following database tables are used as examples to illustrate the general concept of creating and maintaining database search models. It is to be understood that database search models can also be created based on other related database tables, or some non-relational databases (e.g., graph database) that store property data of entities and relationship between entities.

The following table lists 11 example database tables in a relational database, i.e., "EMPL," "EMPL_DETAILS," "TICKET," "CAR," "COST," "MAKER," "CONTACT," "BRAND," "MODEL," "MODEL_TEXT," and "VARIANT." Columns contained in those database tables and descriptions of the columns are also listed. Each database table contains one or more primary keys (marked by asterisk "*" following the corresponding column names), which define a column (or columns) where each value is unique and identifies a single row of the database table. The database tables are related to each other via primary key-foreign key relationships, wherein a foreign key is a column (or columns) in one database table that references the primary key columns in another table. For example, the "EMPL_DETAILS" database table has a primary key "EMPL_ID," the "CAR" database table has a primary key "LICENSE," and the "CAR" database table also has a foreign key "EMPL_ID" which is linked to the primary key of the "EMPL_DETAILS" database table.

| Table | Column | Description of the column |
|---|---|---|
| EMPL | ID * | Employee ID |
| | NAME | Name of the employee |
| | DEPT | Employee's department |
| EMPL_DETAILS | EMPL_ID * | Employee ID |
| | DOB | Employee's data of birth |
| | BIRTHPLACE | Employee's place of birth |
| | SSN | Employee's social security number |
| | DL_DATE | Issue date of the employee's driver's license |

-continued

| Table | Column | Description of the column |
|---|---|---|
| TICKET | ID * | Ticket ID |
| | TYPE | Ticket type ("S" = speeding ticket; "P" = parking ticket) |
| | BINDING | Is the ticket already legally binding? ("Y" = yes; "N" = no; "U" = unknown) |
| | O_DATE | Date of the offense |
| | VALID_TO | Last day of limitation period |
| | AMOUNT | Amount of the fine |
| | EMPL_ID | Employee ID |
| CAR | LICENSE * | License plate of the car |
| | EMPL_ID | Driver's employee ID |
| | MAKER | Car maker's company name (e.g., "Daimler, "Toyota," etc.) |
| | BRAND | Car brand (e.g., "Mercedes-Benz," "Prius,", etc.) |
| | MODEL | Car model (e.g., "E-Class T-model," "Prius plug-in," etc.) |
| | VARIANT | Model variant of the car (e.g., "E 300d," etc.) |
| | COLOR | Color of the car |
| | R_DATE | Registration date of the car |
| | I_NUMBER | Insurance policy number |
| COST | LICENSE * | License plate of the car |
| | SEQ_NR * | Sequential number of the invoice |
| | TYPE | Invoice type |
| | AMOUNT | Gross amount of the invoice |
| | CANCELED | Has the invoice been canceled? ("Y" = yes; "N" = no) |
| MAKER | C_MAKER * | Company name of the car maker |
| | FOUNDED | Founding year of the car manufacturer |
| | FOUNDER | Founder of the company |
| CONTACT | C_MAKER * | Company name of the car maker |
| | VALID_FROM * | Start date of the validity of the contact data |
| | VALID_TO * | End date of the validity of the contact data |
| | ADDRESS | Mailing address |
| | PHONE | Telephone number |
| | EMAIL | E-mail address |
| BRAND | C_MAKER * | Company name of the car maker |
| | C_BRAND * | Car brand |
| | L_YEAR | Launching year of the brand |
| MODEL | C_MAKER * | Company name of the car maker |
| | C_BRAND * | Car brand |
| | C_MODEL * | Car model |
| | CATEG | Vehicle category (e.g., "Full-size," "SUV," etc.) |
| MODEL_TEXT | C_MAKER * | Company name of the car maker |
| | C_BRAND * | Car brand |
| | C_MODEL * | Car model |
| | LANGU * | Language of the text and descriptions |
| | NAME | Language-dependent name of the car model |
| | DESCR | Language-dependent description of the car model's characteristics/highlights |
| VARIANT | C_MAKER * | Company name of the car maker |
| | C_BRAND * | Car brand |
| | C_MODEL * | Car model |
| | C_VARIANT * | Car model variant |
| | POWER | Horsepower |
| | MPG | Fuel efficiency in miles per gallon |
| | SEATS | Number of seats |

Example 5—Example Overall Structure of Hierarchical Database Search Models

Figure 3:
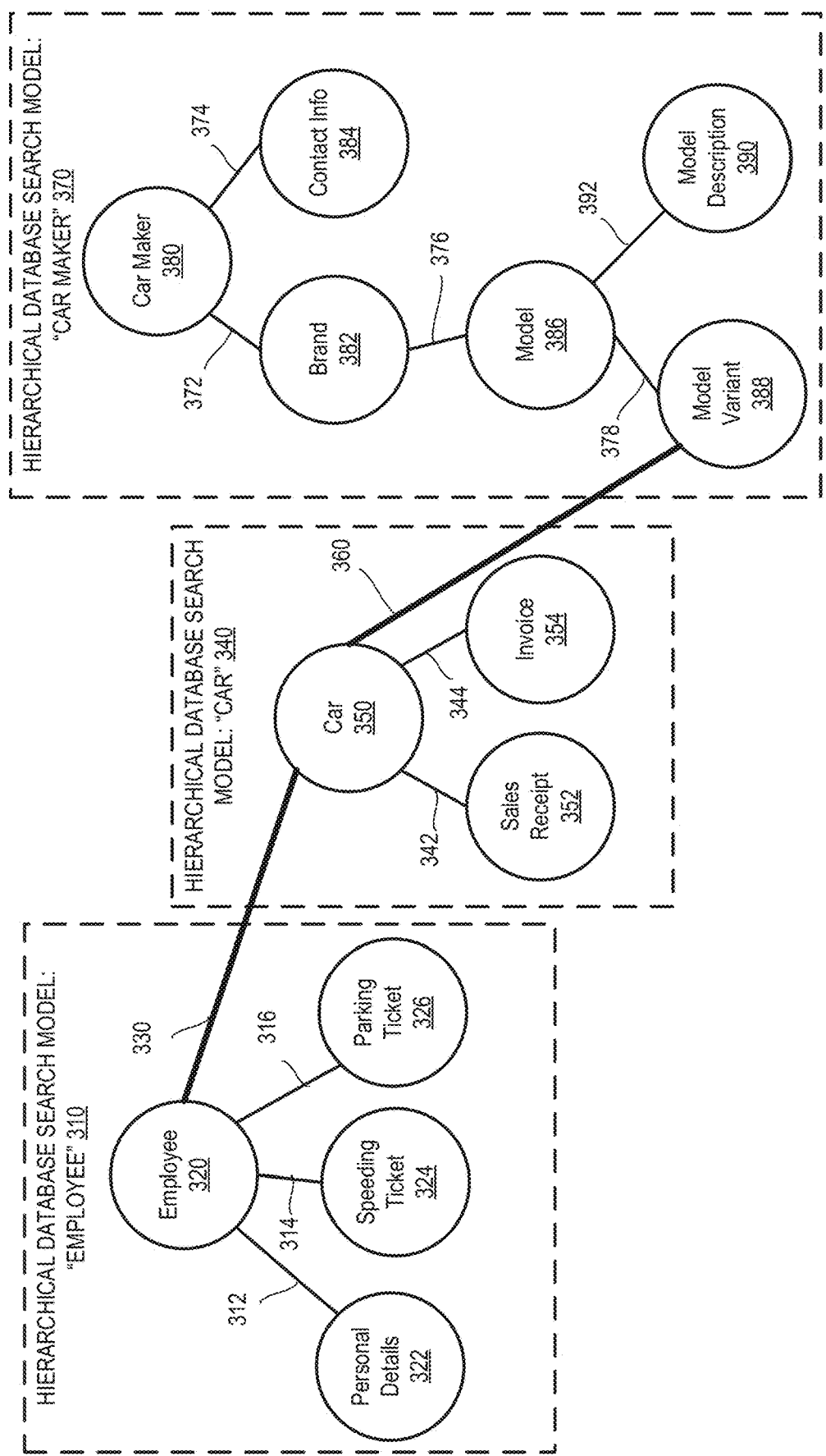
FIG. 3 is an example diagram illustrating hierarchical representation of database search models.

As examples, FIG. 3 shows three hierarchical database search models (i.e., "EMPLOYEE" 310, "CAR" 340, and "CAR MAKER" 370) constructed based on the database tables described above.

Nodes, Root Nodes, and Inner Nodes

As described herein, a hierarchical database search model can comprise a plurality of nodes representing objects. The objects can represent things (e.g., cars, speeding tickets, invoices, etc.), detailed information about things (e.g., car model description, etc.), persons (e.g., employees, etc.) or detailed information about persons (e.g., personal details of employees, etc.). One of the nodes in the hierarchical database search model can be specified as a "root node," and the other nodes can be specified as "inner nodes." For example, the database search model "EMPLOYEE" 310 comprises a root node "Employee" 320 and three inner nodes: "Personal Details" 322, "Speeding Ticket" 324, and "Parking Ticket" 326. The database search model "CAR" 340 comprises a root node "Car" 350 and two inner nodes: "Sales Receipt" 352 and "Invoice" 354. The database search model "CAR MAKER" 370 comprises a root node "Car Maker" 380 and five inner nodes: "Brand" 382, "Contact Info" 384, "Model" 386, "Model Variant" 388 and "Model Description" 390.

As described herein, a hierarchical database search model can contain exactly one root node, which can serve as the hierarchical search model's entry point for data searching. Generally, a root node represents the most important object of the corresponding hierarchical search model (e.g., root node "Employee" 320 in the hierarchical search model "EMPLOYEE" 310, node "Car" 350 in the hierarchical search model "CAR" 340, etc.). As described further below, the root node can contain supported response fields and supported request fields, which may reference node fields of the root node itself or node fields of other nodes.

As described herein, a hierarchical database search model can contain an arbitrary number of inner nodes. The inner nodes can represent search-related less important objects (e.g., employee's "Speeding Ticket" 324 and "Personal Details" 322 in the hierarchical search model "EMPLOYEE" 310, the car-related "Invoice" in the hierarchical search model "CAR" 340, etc.). While an inner node itself does not contain any response fields or request fields, some of the inner node's node fields can be used as basis for the response fields and request fields of a root node, as described further below.

Edges, Model-internal Edges, and Inter-model Edges

The hierarchical database search models can also include a plurality of edges connecting the nodes. As described herein, an edge connects two nodes that are directly semantically related to each other. When two nodes connected by an edge represent two objects based on two different database tables, the edge can model a foreign key relationship between the two database tables. As described herein, an edge can be undirected, i.e., an edge connecting nodes "P" and "Q" also connects the nodes "Q" and "P."

Some of the edges can be referred to as "model-internal edges" because they connect nodes that belong to the same hierarchical database search model such that the nodes are organized in a hierarchical, or tree-like structure. For example, the database search model "EMPLOYEE" 310 comprises three model-internal edges: 312, 314, and 316. The database search model "CAR" 340 comprises two model-internal edges: 342 and 344. The database search model "CAR MAKER" 370 comprises five model-internal edges: 372, 374, 376, 378 and 392.

Some of the edges can be referred to as "inter-model edges" because they connect nodes that belong to different hierarchical database search models. In the depicted example, an inter-model edge 330 connects the root node "Employee" 320 in the database search model "EMPLOYEE" 310 with the root node "Car" 350 in the database search model "CAR" 340. Another inter-model edge 360 connects the root node "Car" 350 in the database search model "CAR" 340 with the inner node "Model Variant" 388 in the database search model "CAR MAKER" 370.

Thus, two nodes connected by an edge may or may not belong to the same hierarchical database search model. For example, the node "Car" 350 of the database search model "CAR" 340 is connected with the node "Model Variant" 388 of the database search model "CAR MAKER" 370 via the inter-model edge 360. On the other hand, both the nodes "Brand" 382 and "Model" 386 belong to the database search model "CAR MAKER" 370 and they are connected to each other via the inner the model-internal edge 376.

Example 6—Example Components of Hierarchical Database Search Models

Besides nodes and edges, a hierarchical database search model can also include other components such as "node fields," "node filters," "node limiters," "response fields," "request fields," "edge field mappings," "edge fixed values," "navigation paths," "navigation path steps," etc., as described below.

Node Fields

As described herein, the nodes in hierarchical database search models comprise respective node fields which contain and/or represent search-relevant data, which is imported from corresponding database tables. For example, the node "Personal Details" 322 (which is based on the database table "EMPL_DETAILS" described above) can include the following node fields: "Personnel Number," "Date of Birth," "Place of Birth," "Social Security Number," and "Issue Date of Driver's License." Each node field can be based on a specific single column of the underlying database table. For example, the node field "Personnel Number" can be based on the table column "EMPL_ID" and the node field "Date of Birth" can be based on the table column "DOB," etc. The name of a node field can be the same as or different from the name of the corresponding table column As described further below, the node fields can serve as basis for the response fields and request fields.

As described herein, each node in a hierarchical database search model can be based on a specific database table. For example, the "Employee" node 320 can be based on the database table "EMPL" described above. In certain embodiments, a node can restrict the set of columns in the corresponding database table. In other words, not every column of the underlying database table may be represented by node fields of a node. Table columns which are irrelevant for the hierarchical search model can be omitted from the node. In certain embodiments, the set of the database table's rows can be restricted via node filters and node limiters, as described below. Thus, not every row of the underlying database table may be represented by the node. In other words, a node may represent just a specific section or segment (e.g., selected rows) of the database table's data.

On the other hand, multiple nodes in the hierarchical database search models may be based on the same database table. For example, two different nodes may cover different subsets of the same database table's columns and rows, for example, by applying node filters and/or node limiters, as explained below.

Node Filters and Node Limiters

As described herein, a node filter belongs to a specific node and references a specific column of the node's underlying database table. Specifically, the node filter can filter the rows of the underlying database table based on which the node is constructed. For example, the nodes "Speeding Ticket" 324 and "Parking Ticket" 326 can be based on the same database table "TICKET." A node filter of the node "Speeding Ticket" 324 can restrict the rows of the underlying database table "TICKET" to TYPE="S" (i.e., speeding ticket). In contrast, a node filter of the node "Parking Ticket" 326 can restrict the rows of the database table "TICKET" to TYPE="P" (i.e., parking ticket). Thus, although nodes 324 and 326 are based on the same database table, they represent different subsets of the search-relevant data.

On the other hand, a node may have several node filters. In general, all node filters of a single node can be implicitly logically-AND-connected. However, all node filters referring to the same column of the underlying database table can be implicitly logically-OR-connected. For example, the node "Speeding Ticket" 324 can have the following two (logically-AND-connected) node filters: TYPE="S" (i.e., speeding ticket) and BINDING="Y" (i.e., legally binding). Since these two node filters refer to different columns (i.e., column "TYPE" and column "BINDING"), the two node filters are logically-AND-connected.

Similar to a node filter, a node limiter can also be used to limit the rows of the node's underlying database table. In contrast to the all-purpose node filters, the node limiters can be used to realize the data restriction in the context of language dependencies and/or time dependencies. Example node limiters include language node limiter, valid-from node limiter, and valid-to node limiter.

By applying the language node limiter, the assigned column of the database table can be limited to the language code of the current search language (e.g., the logon language). For example, if a language node limiter is assigned to column "LANGU" of the database table "MODEL_TEXT," the effect is equivalent to applying the node filter LANGU="EN" to this database table (assuming "EN" is the current search language). However, since the logon language(e.g., "EN") is unknown when creating the hierarchical database search model, the proper node filter could not be specified. Using the language node limiter (instead of a node filter), it is not required to know the future search language when creating the hierarchical database search model. Thus, assigning the language node can ensure that all language-dependent texts of the database table will be restricted to the current search language.

By applying the valid-from node limiter, the assigned column of the database table can be limited to timestamps that are not in the future. For example, if a valid-from node limiter is assigned to column "VALID_FROM" of the database table "CONTACT," the effect can be equivalent to applying the node filter VALID_FROM<="12/31/2020" to this database table (assuming today is 12/31/2020). However, since the day of search execution (e.g., "12/31/2020") is unknown when creating the hierarchical database search model, the proper node filter could not be specified. Using the valid-from node limiter (instead of a node filter), it is not required to know the day of search execution in advance. In a similar manner, by applying the valid-to node limiter, the assigned column of the database table can be limited to timestamps that are not in the past.

As described herein, a node limiter belongs to a specific single node. A node limiter can be assigned to a specific column of the node's underlying database table. Further, a single node can have several node limiters. All node limiters of a single node can be implicitly logically-AND-connected.

Edge Field Mappings and Edge Fixed Values

As described herein, edge field mappings can specify how two nodes connected by an edge are related to each other. For example, the nodes "Employee" 320 and "Personal Details" 322 are connected via the edge 312. The corresponding edge field mapping "Employee"."Employee ID"="Personal Details"."Personnel Number" specifies that an item of the node "Employee" 320 corresponds to an item of the node "Personal Details" 322, if the "Employee ID" value of the node "Employee" 320 equals the "Personnel Number" value of the node "Personal Details" 322. In other words, the node field "Employee ID" of node "Employee" 320 corresponds to the node field "Personnel Number" of the node "Personal Details" 322.

As described herein, an edge field mapping belongs to a specific edge. However, an edge can have several edge field mappings. All edge field mappings of an edge can be implicitly logically-AND-connected. For example, the edge 376 between the nodes "Brand" 382 and "Model" 386 has the following two (logically-AND-connected) edge field mappings: "Brand"."Car Maker"="Model"."Car Maker" and "Brand"."Car Brand"="Model"."Car Brand".

As described herein, edge fixed values, if needed, can be used to complement the information of the edge field mappings. An edge fixed value can sharpen the condition that is used to express how the two edge-connected nodes relate to each other. For example, the nodes "Car" 350 and "Sales Receipt" 352 are connected via an edge 342. The edge field mapping "Car"."License Plate"="Sales Receipt"."License Plate" can assign each invoice to the right car. However, the edge fixed value "Sales Receipt"."Cost Type"="SR" can sharpen the assignment condition to consider invoices of type "SR" (i.e., sales receipt) only.

As described herein, an edge fixed value belongs to a specific edge. However, an edge can have several edge fixed values. In general, all edge fixed values of an edge can be implicitly logically-AND-connected. However, all edge fixed values which refer to one and the same node field can be implicitly logically-OR-connected. For example, the nodes "Car" 350 and "Invoice" 354 are connected via an edge 344. The edge field mapping "Car"."License Plate"="Invoice"."License Plate" can assign each invoice to the right car. However, two edge fixed values "Invoice"."Cost Type"="RNC" and "Invoice"."CostType"="RCC" can sharpen the assignment condition to consider only invoices with type "RNC"(i.e., running costs) or type "RCC" (i.e., recurring costs). Here, because both edge fixed values refer to the same node field "Cost Type," they are implicitly logically-OR-connected.

Navigation Paths and Navigation Path Steps

As described herein, two nodes may be connected via an edge and/or via a navigation path comprising one or more navigation path steps, wherein each navigation path step corresponds to an edge. Like an edge, a navigation path is undirected, i.e., a navigation path connecting the nodes "P" and "Q" also connects the nodes "Q" and "P."

In some embodiments, a navigation path may comprise a single edge that directly connects two nodes. For example, the navigation path from the node "Employee" 320 to the node "Car" 350 includes a single edge 330. In some embodiments, a navigation path connecting two nodes may include a sequence of edges. For example, the navigation path from the node "Employee" 320 to the node "Model Variant" 388 includes two edges 330 and 360.

Two nodes connected by a navigation path may or may not belong to the same hierarchical database search model. For example, the node "Employee" 320 of the database search model "EMPLOYEE" 310 is connected with the node "Model Variant" 388 of the database search model "CAR MAKER" 370 via a navigation path consisting of edges 330 and 360. On the other hand, both the nodes "Car Maker" 380 and "Model Variant" 388 belong to the database search model "CAR MAKER" 370 and they are indirectly connected via a navigation path consisting of edges 372, 376, and 378.

As described further below, navigation paths can be used to realize a link between a response field and the underlying/referenced node field. In addition, navigation paths can be used to realize a link between a request field and the underlying/referenced node field. For example, In our example, the root node "Employee" 320 of the database search model "EMPLOYEE" 310 can have a response field "Mailing Address of Maker of Company Car" which references the node field "Address" of node "Contact Info" 384 of database search model "CAR MAKER" 370. The link between the above-mentioned response field and the underlying node field can be realized with the help of a navigation path which connects the nodes "Employee" 320 and "Contact Info" 384 via the following links: 330, 360, 378, 376, 372, and 374.

The parts of a navigation path can be referred to as navigation path steps, wherein each navigation path step corresponds to a single edge connecting two nodes. In the above example, the navigation path connecting the nodes "Employee" 320 and "Contact Info" 384 consists of six navigation path steps: "Employee"-"Car," "Car"-"Model Variant," "Model Variant"-"Model," "Model"-"Brand," "Brand"-"Car Maker," and "Car Maker"-"Contact Info."

As described herein, a navigation path step belongs to a specific navigation path and is based on a specific single edge. However, one and the same edge may be the basis for several navigation path steps. Like an edge, a navigation path step is undirected, i.e., a navigation path step connecting the nodes "P" and "Q" also connects the nodes "Q" and "P."

Response Fields and Request Fields

As described herein, response fields can be used to specify the format (e.g., structure and/or appearance) of the database search results so that for each search hit, only the values of the response fields are returned and/or displayed. For example, if the employee's date of birth should be part of the search result, a response field can be specified which is based on the node field "Date of Birth" of the Node "Personal Details" 322.

In certain embodiments, a response field can include the following parameters or properties (including Boolean-type control flags):

- "Is Title Response Field"—"Yes" or "No" (Is the response field a part of the title of the search hit?)
- "Position Number"—Position of the response field within the title or within the non-title section of the search hit
- "Type Info"—Does the response field represent a number, a string, a date, a time, a telephone number, or an e-mail address?
- "Formatting Details"—For example: Should a date be formatted as YYYY-MM-DD or YYYY/MM/DD or MM/DD/YYYY or YYYY-MM/DD or DD.MM.YYYY, or others?

As described herein, a response field belongs to the root node of a specific database search model. For example, in FIG. 3, only the root nodes "Employee" 320, "Car" 350 and "Car Maker" 380 have response fields, wherein inner nodes do not have any response fields.

As described herein, when a hierarchical database search model is utilized for search execution, only the response fields of the database search model's own root node is considered or used. For example, a database search via the database search model "EMPLOYEE" 310 only takes the response fields of the root node "Employee" 320 into account whereas the response fields of the root nodes "Car" 350 and "Car Maker" 380 are ignored.

As described herein, a response field is specified based on a specific single node field. The response field and its underlying node field may or may not belong to the same node. When the response field and its underlying node field belong to different nodes, a navigation path needs to be specified to connect the two nodes. On the other hand, when the response field and its underlying node field belong to the same node, no navigation path needs to be specified.

As described herein, a response field and its underlying node field may belong to different database search models. Thus, a database search across multiple database search models can be realized, although only the response fields of the own (i.e., starting) database search model are taken into account.

As described herein, request fields can be used to specify which node fields should be scanned for the search terms. Thus, request fields can define a scope of the data search. When the search is executed, only the values of the request fields are considered to find matches with the search terms. In other words: if a node field is not the basis for a request field, then it is not scanned for the search terms. For example, an employee should be searchable via her/his social security number. Thus, a request field can be specified to be based on the node field "Social Security Number" of the node "Personal Details" 322.

In certain embodiments, a request field can include the following parameters or properties (including Boolean-type control flags):

- "Is Freestyle Search Request Field"—"Yes" or "No" (Is the request field considered by a freestyle search? A freestyle search can be a Google-like search across all request fields for a quick and easy search experience.)
- "Relevance to Freestyle Search"—between 0% and 100% (How relevant is a match of a search term in this request field? For example, a match in the request field "Employee's Name" may be more relevant than a match in the request field "Founder of the Manufacturer of the Employee's Company Car.")
- "Is Advanced Search Request Field"—"Yes" or "No" (Is the request field available for an advanced search? An advanced search can be a fine-granular search with detailed search criteria for experienced domain experts.)
- "Is Facetted Search Request Field"—"Yes" or "No" (Does the request field support a facetted search? A facetted search can allow a targeted restriction of the current search result set based on the value distribution of the node fields.)
- "Is Auto Completion Request Field"—"Yes" or "No" (Does the request field provide the auto completion feature? Auto completion means that the enterprise search can predict the rest of the search term when a user is typing.)
- "Degree of Fuzziness"—between 0% and 100% (How tolerant is this request field with respect to typing errors of the search terms?)

As described herein, a request field belongs to the root node of a specific database search model. For example, only the root nodes "Employee" 320, "Car" 350 and "Car Maker" 380 have request fields, whereas the inner nodes do not have any request fields.

As described herein, when a hierarchical database search model is utilized for search execution, only the request fields of the database search model's own root node are considered or used. For example, a database search via the database search model "EMPLOYEE" 310 only takes the request fields of the root node "Employee" 320 into account, whereas the request fields of the root nodes "Car" 350 and "Car Maker" 380 are ignored.

As described herein, a request field is based on a specific single node field. The request field and its underlying node field may or may not belong to same node. When the request field and its underlying node field belong to different nodes, a navigation path connecting the two nodes needs to be specified. On the other hand, when the request field and its underlying node field belong to the same node, no navigation path needs to be specified.

As described herein, a request field and its underlying node field may belong to different database search models. Thus, a database search across multiple database search models can be realized, although only the request fields of the own (or starting) database search model are taken into account.

Example Storage of Hierarchical Database Search Models

In some embodiments, an enterprise system (e.g., 100) can maintain an enterprise search model repository (e.g., 130) which stores the metadata of all hierarchical database search models. Such metadata can include all required information about the nodes (including root nodes and inner nodes), node filters, node limiters, node fields, edges, edge field mappings, edge fixed values, navigation paths, navigation path steps, response fields and request fields, as described above. In certain embodiments, the enterprise search model repository (e.g., 130) can include several metadata tables which store the required information. For example, the information about nodes can be stored in one metadata table. The information about node filters can be stored in another metadata table. The information about node limiters can be stored in yet another metadata table, and so on.

Example 7—Example Overview of Generic Database Search Models

While the hierarchical database search models described above can model various objects of a business and provide a useful means of enterprise search, they have some inherent limitations. For example, because the hierarchical database search models do not separate between structural aspects and search specifics, creation of new database search models as well as the maintenance, modification, and correction of existing database search models can be difficult. Further, restricted modeling options (e.g., the limitation that arbitrary Boolean expressions cannot be used for defining filters) make the creation and maintenance of database search models challenging. The hierarchical database search models described above also have some implicit rules, which may be difficult to understand by a user and/or difficult to maintain by a developer. In addition, there is a lack of reusability for parts (e.g., nodes) of the hierarchical database search models, which can result in a higher redundancy and the associated higher maintenance cost and increased error-proneness. For example, as a result of technological change, some of the hierarchical database search models may have to be retired. In order to save the investments that have been made in developing and maintaining those hierarchical database search models, they have to be transformed into a new, future-proof format. However, due to the above-mentioned limitations, such transformation can be complicated.

The generic database search models described below can overcome the above-mentioned limitations. In contrast to hierarchical database search models, the generic database search models can separate structural information from search specifics. As described more fully below, the generic database search models can include two different types of containers: structural containers encapsulating structural information but without search specifics, and search enabling containers encapsulating search specifics but without structural information.

Figure 4:
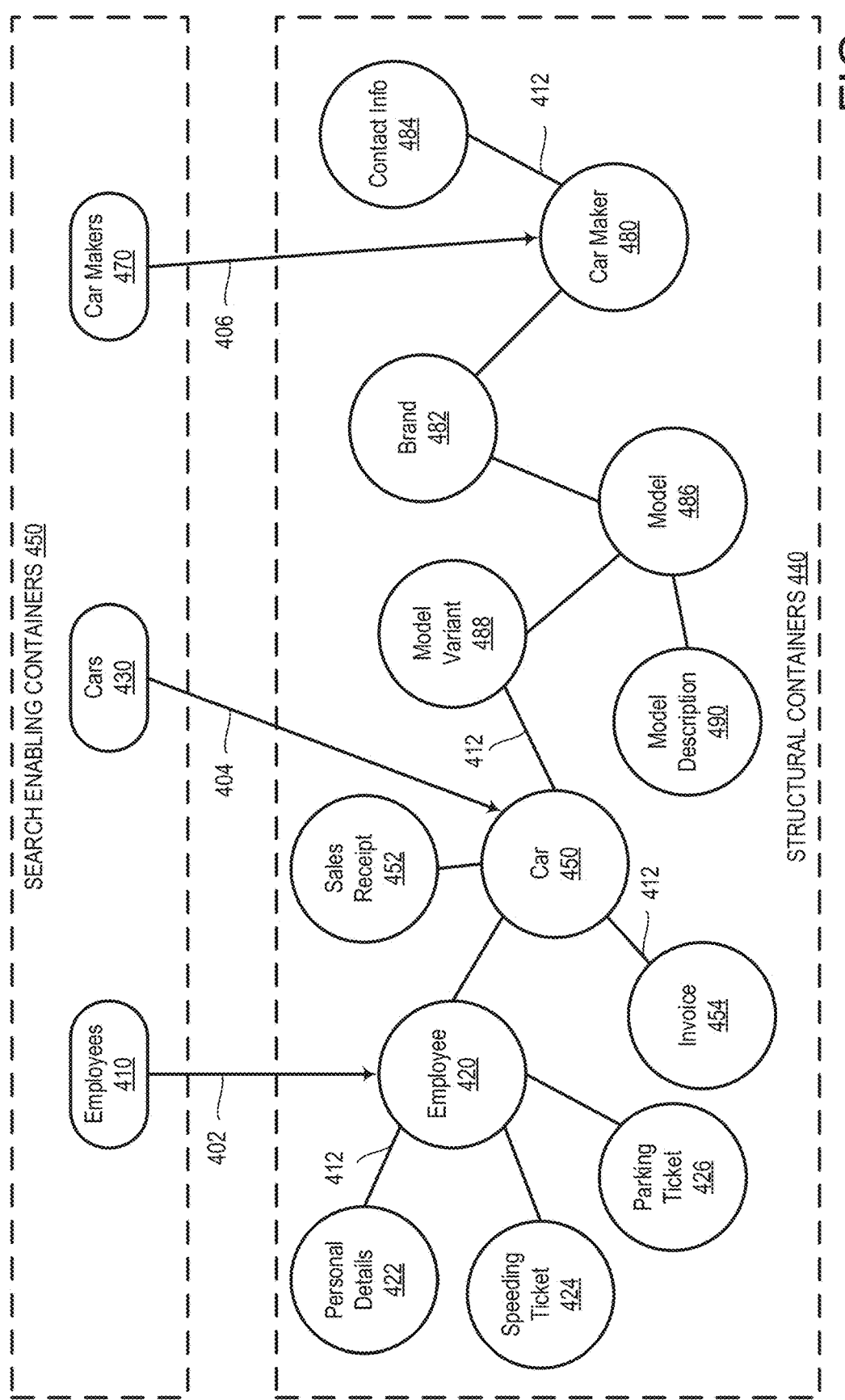
FIG. 4 is an example diagram illustrating a generic representation of database search models.

As examples, FIG. 4 shows 13 structural containers (collectively, 440), including the "Employee" container 420, the "Personal Details" container 422, the "Speeding Ticket" container 424, the "Parking Ticket" container 426, the "Car" container 450, the "Sales Receipts" container 452, the "Invoice" container 454, the "Car Maker" container 480, the "Brand" container 482, the "Contact Info" container, 484, the "Model" container 486, the "Model Variant" container 488, and the "Model Description" container 490. Although these containers have respective matching nodes in FIG. 3, these containers are different from the nodes because they do not contain search specifics (e.g., response fields or request fields). In addition, the containers are interconnected by directional links 412 instead of undirected edges. Further, the containers are organized in a flat structure instead of hierarchical structure as shown in FIG. 3.

FIG. 4 also shows a plurality of search enabling containers 450, including the "Employees" search enabling container 410, the "Cars" search enabling container 430, and the "Car Makers" search enabling container 470. Each of the search enabling containers has a link or reference pointing to a specific structural container (also referred to as a "primary structural container"). For example, the "Employees" search enabling container 410 has a reference 402 pointing to the primary structural container "Employee" 420, the "Cars" search enabling container 430 has a reference 404 pointing to the primary structural container "Car" 450, and the "Car Makers" search enabling container has reference 406 pointing to the primary structural container "Car Maker" 480.

As described herein, structural containers can serve as the basis for the search enabling containers, and they are independent from a specific database search model. Importantly, a structural container can be re-used by multiple database search models. In contrast, a search enabling container belongs to only one specific database search model. Thus, the generic database search models can have a number of practical applications. For example, they can be used as a storage format to supersede or replace the hierarchical database search models, as a modeling format to simplify and speed up the process of database search modeling, as an interchange format for sending the database search models to other systems and/or receiving database search models from other systems, and/or as an intermediate format when transforming hierarchical database search models into new, future-proof formats.

Example 8—Example Structural Containers

Structural containers represent or model objects having a structural relationship and contain property data of the objects. Similarly, the objects can be things (e.g., cars, speeding tickets, invoices, etc.), detailed information about things (e.g., car model description, etc.), persons (e.g., employees, etc.) or detailed information about persons (e.g., personal details of employees, etc.). As described below, the structural relationship between the objects can be represented by the source reference tables and lists of links within the structural containers. The property data of the objects, which can be represented by the lists of fields, can be obtained from corresponding or underlying database tables. In some embodiments, filter expressions can be used to filter or restrict rows of the underlying database tables.

In contrast to the search enabling containers, the structural containers are free from or devoid of search specifics, such as information about response fields (specifying the format of search results) or request fields (defining the scope of data search). Structural containers are independent from any specific generic database search model. Typically, a structural container can be shared and/or re-used by multiple generic database search models.

Figure 5:
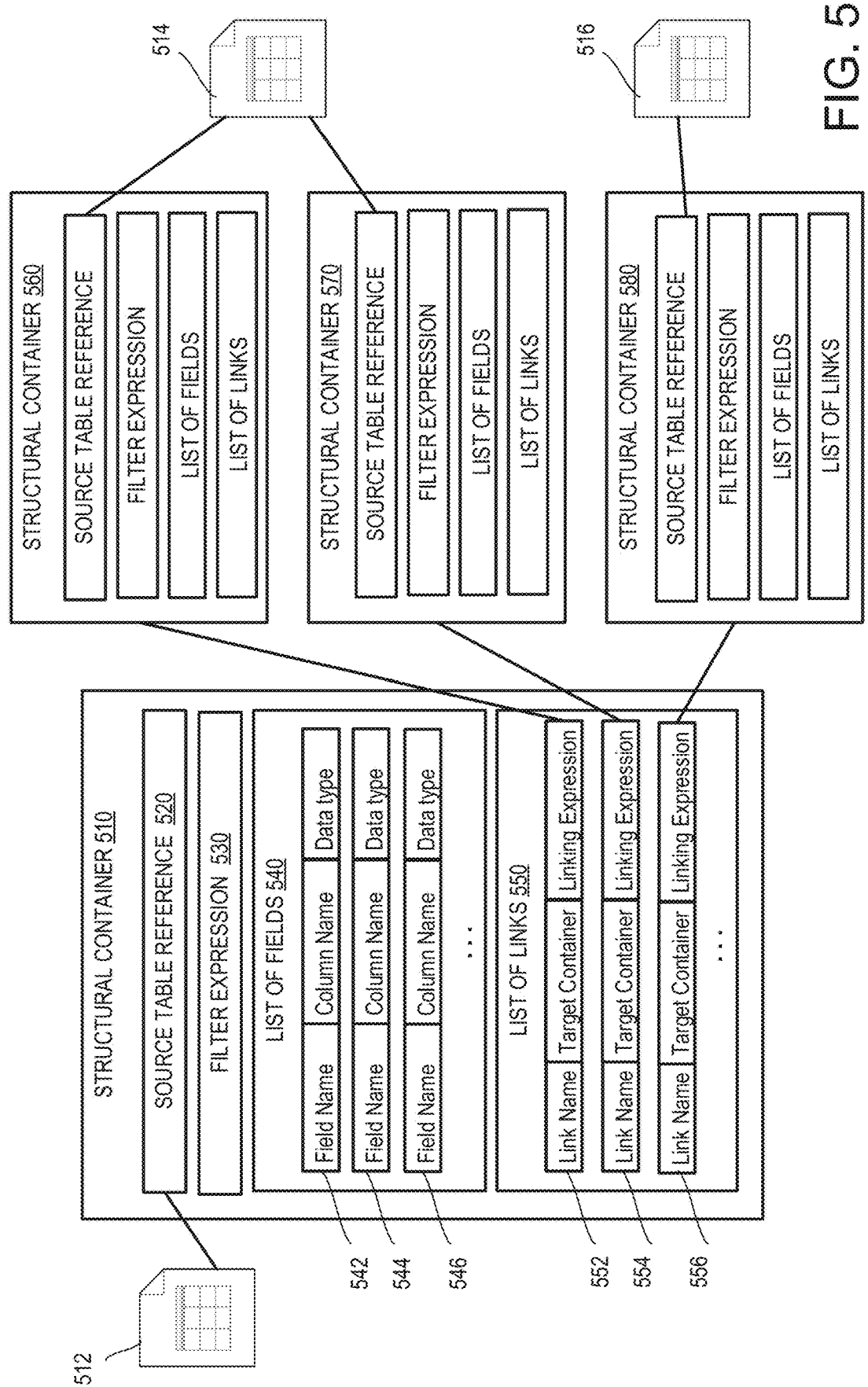
FIG. 5 is a diagram illustrating an example construct of structural containers.

In certain embodiments, as illustrated in FIG. 5, a structural container 510 can include a source table reference 520 specifying an underlying database table 512 from which the property data of the object represented structural container 510 is obtained. The structural container 510 can also include a filter expression 530, which can be an arbitrary Boolean expression for filtering the rows of the underlying database table 512. The structural container 510 can further include a list of fields 540 (e.g., 542, 544, 546, etc.), which specify the selection of potentially search-relevant table columns and represent property data of the object modeled by the structural container. In addition, the structural container 510 can include a list of links 550 (e.g., 552, 554, 556, etc.). Each link in the structural container 510 can point to another semantically related structural container. For example, the links 552, 554, and 556 of the structural container 510 respectively point to structural containers 560, 570, and 580. Thus, the lists of links, together with the source table references, can model a structural relationship between the objects represented by the structural containers.

Each structural container is based on a specific database table, and the source table reference can point to such database table. For example, the structural container "Employee" 420 can be based on the database table "EMPL". Thus, the source table reference of the structural container "Employee" 420 can point to the database table "EMPL."

In some embodiments, several structural containers may be based on the same database table. In such cases, the source table references of multiple structural containers may point to the same database table. For example, as shown in FIG. 5, both the source table reference of structural container 560 and the source table reference of structural container 570 point to the same underlying database table 514. Such scenario can occur when the structural containers cover different subsets of the database table's columns and/or rows. For example, the structural containers "Speeding Ticket" 424 and "Parking Ticket" 426 are based on the same database table "TICKET." Thus, the source table references of the structural containers "Speeding Ticket" 424 and "Parking Ticket" 426 can point to the shared database table "TICKET."

In example embodiments, a filter expression can be a single and complete Boolean expression which is used to filter the rows of the underlying database table. In other words, the set of the database table's rows can be filtered or restricted via a single and complete Boolean expression. Thus, a structural container may represent just a specific subset of the underlying database table's data, instead of every row of the underlying database table. For example, the structural container "Speeding Ticket" 424 can have the following filter expression: TYPE='S' AND BINDING='Y' AND VALID_TO>=SP_CURRENT_DATES. In another example, the structural container "Parking Ticket" 426 can have the following filter expression: TYPE='P' AND BINDING='Y' AND VALID_TO>=SP_CURRENT_DATES.

In certain embodiments, the list of fields in a structural container can include any potentially search-relevant fields, but not every field of the list has to be actually search-relevant. In other words, the list of fields may include some fields which are merely potentially, but not actually, search-relevant. For example, the structural container "Personal Details" 422 can have the following list of fields: "Personnel Number," "Date of Birth," "Place of Birth," "Social Security Number," and "Issue Date of Driver's License."

As described herein, each field can be based on a specific single column of the underlying database table. For example, the Field "Personnel Number" can be based on the table column "EMPL_ID," the field "Date of Birth" can be based on the table column "DOB," and so on.

In certain embodiments (see e.g., FIG. 5), each field in the list of fields can include the following information or parameters: field name (e.g., "Personnel Number"), column name of the referenced/underlying database table (e.g., "EMPL_ID"), and data type of the field (e.g., "String with a maximal length of 10."). The field name may be the same or different from the name column name of the underlying database table.

In certain embodiments, a structural container contains a list of links, wherein each link can point to a directly semantically related structural container. While each link is directional and asymmetrical (e.g., a link points from "P" to "Q"), the characteristic "directly semantically related" is symmetrical (if "P" is directly semantically related to "Q", then "Q" is also directly semantically related to "P"). Thus, links generally occur in pairs. In other words, if there is a link which points from "P" to "Q," then there is also a pairing link which points from "Q" to "P."

For example, the structural containers "Car" 450 and "Model Variant" 488 are directly semantically related to each other. Thus, the list of links of the structural container "Car" 450 can contain a link to the structural container "Model Variant" 488. Correspondingly, the list of links of the structural container "Model Variant" 488 can also contain a pairing link to the structural container "Car" 450.

In certain embodiments (see e.g., FIG. 5), each link in the list of links can include a link name, the name of the target structural container, and a linking expression, which can be a single and complete Boolean expression which specifies how the two structural containers relate to each other.

In one example embodiment, a linking expression can use the keyword "SELF" to refer to the current structural container and use the keyword "TARGET" to refer to the target structural container. For example, the list of links of the structural container "Car" 450 can contain a link to the structural container "Invoice" 454. For this link, the link name can be "_to_Invoice," the target structural container can be "Invoice," and the linking expression can be SELF."License Plate"=TARGET."License Plate" AND (TARGET."Cost Type"="RNC" OR TARGET."Cost Type"="RCC").

In the above example, the linking expression describes how the two structural containers "Car" 450 and "Invoice" 454 relate to each other. Inside this linking expression, the keyword "SELF" refers to the current structural container "Car" 450, and the keyword "TARGET" refers to the target structural container "Invoice" 454. Via the partial Boolean expression SELF."License Plate"=TARGET."License Plate", each invoice can be assigned to the right car. The remaining part of the linking expression (TARGET."Cost Type"="RNC" OR TARGET."Cost Type"="RCC") has the effect that only invoices with type "RNC" (i.e., running costs) or type "RCC" (i.e., recurring costs) are considered.

As examples, the tables below respectively list components of the 13 structural containers shown in FIG. 4 (notation "–/–" means empty).

| Structural Container: "Employee" | | |
|---|---|---|
| Source table reference: "EMPL" | Filter expression: —/— | |
| List of fields (Field Name, Column Name, Data Type) | | |
| Employee ID | ID | STRING(10) |
| Name | NAME | STRING(60) |

-continued

| Structural Container: "Employee" | | |
|---|---|---|
| Source table reference: "EMPL" | | Filter expression: —/— |
| Department | DEPT | STRING(40) |
| List of Links (Link Name, Target Structural Container, Linking Expression) | | |
| _to_Personal_Details | Personal Details | SELF."Employee ID" = TARGET."Personnel Number" |
| _to_Speeding_Ticket | Speeding Ticket | SELF."Employee ID" = TARGET."Employee ID" |
| _to_Parking_Ticket | Parking Ticket | SELF."Employee ID" = TARGET."Employee ID" |
| _to_Car | Car | SELF."Employee ID" = TARGET."Driver's Employee ID" |

| Structural Container: "Personal Details" | | |
|---|---|---|
| Source table reference: "EMPL_DETAILS" | | Filter expression: —/— |
| List of fields (Field Name, Column Name, Data Type) | | |
| Personnel Number | EMPL_ID | STRING(10) |
| Date of Birth | DOB | DATE |
| Place of Birth | BIRTHPLACE | STRING(80) |
| Social Security Number | SSN | STRING(9) |
| Issue Date of Driver's License | DL_DATE | DATE |
| List of Links (Link Name, Target Structural Container, Linking Expression) | | |
| _to_Employee | Employee | SELF."Personnel Number" = TARGET."Employee ID" |

| Structural Container: "Speeding Ticket" | | |
|---|---|---|
| Source table reference: "TICKET" | | Filter expression: TYPE = 'S' AND BINDING = 'Y' AND VALID_TO >= $P_CURRENT_DATE$ |
| List of fields (Field Name, Column Name, Data Type) | | |
| Ticket ID | ID | STRING(20) |
| Date of the Offense | O_DATE | DATE |
| Amount of the Fine | AMOUNT | AMOUNT_OF_MONEY |
| Employee ID | EMPL_ID | STRING(10) |
| List of Links (Link Name, Target Structural Container, Linking Expression) | | |
| _to_Employee | Employee | SELF."Employee ID" = TARGET."Employee ID" |

| Structural Container: "Parking Ticket" | | |
|---|---|---|
| Source table reference: "TICKET" | | Filter expression: TYPE = 'P' AND BINDING = 'Y' AND VALID_TO >= $P_CURRENT_DATE$ |
| List of fields (Field Name, Column Name, Data Type) | | |
| Ticket ID | ID | STRING(20) |
| Date of the Offense | O_DATE | DATE |
| Amount of the Fine | AMOUNT | AMOUNT_OF_MONEY |
| Employee ID | EMPL_ID | STRING(10) |
| List of Links (Link Name, Target Structural Container, Linking Expression) | | |
| _to_Employee | Employee | SELF."Employee ID" = TARGET."Employee ID" |

| Structural Container: "Car" | | |
|---|---|---|
| Source table reference: "CAR" | | Filter expression: —/— |
| List of fields (Field Name, Column Name, Data Type) | | |
| License Plate | LICENSE | STRING(15) |
| Driver's Employee ID | EMPL_ID | STRING(10) |
| Car Maker | MAKER | STRING(45) |
| Car Brand | BRAND | STRING(45) |
| Car Model | MODEL | STRING(45) |
| Model Variant | VARIANT | STRING(45) |
| Color | COLOR | STRING(30) |
| Registration Date | R_DATE | DATE |
| Insurance Policy Number | I_NUMBER | STRING(20) |
| List of Links (Link Name, Target Structural Container, Linking Expression) | | |
| _to_Employee | Employee | SELF."Driver's Employee ID" = TARGET."Employee ID" |
| _to_Sales_Receipt | Sales Receipt | SELF."License Plate" = TARGET."License Plate" AND TARGET."Cost Type" = 'SR' |
| _to_Invoice | Invoice | SELF."License Plate" = TARGET."License Plate" AND (TARGET."Cost Type" = 'RNC' OR TARGET."Cost Type" = 'RCC') |

-continued

| Structural Container: "Car" | | |
|---|---|---|
| Source table reference: "CAR" | Filter expression: —/— | |
| _to_Model_Variant | Model Variant | SELF."Car Maker" = TARGET."Car Maker" AND SELF."Car Brand" = TARGET."Car Brand" AND SELF."Car Model" = TARGET."Car Model" AND SELF."Model Variant" = TARGET."Car Model Variant" |

| Structural Container: "Sales Receipt" | | |
|---|---|---|
| Source table reference: "COST" | Filter expression: CANCELED = 'N' | |
| List of fields (Field Name, Column Name, Data Type) | | |
| License Plate | LICENSE | STRING(15) |
| Cost Type | TYPE | STRING(5) |
| Gross Amount | AMOUNT | AMOUNT_OF_MONEY |
| List of Links (Link Name, Target Structural Container, Linking Expression) | | |
| _to_Car | Car | SELF."License Plate" = TARGET."License Plate" AND SELF."Cost Type" = 'SR' |

| Structural Container: "Invoice" | | |
|---|---|---|
| Source table reference: "COST" | Filter expression: CANCELED = 'N' | |
| List of fields (Field Name, Column Name, Data Type) | | |
| License Plate | LICENSE | STRING(15) |
| Cost Type | TYPE | STRING(5) |
| Gross Amount | AMOUNT | AMOUNT_OF_MONEY |
| List of Links (Link Name, Target Structural Container, Linking Expression) | | |
| _to_Car | Car | SELF."License Plate" = TARGET."License Plate" AND (SELF."Cost Type" = 'RNC' OR SELF."Cost Type" = 'RCC') |

| Structural Container: "Car Maker" | | |
|---|---|---|
| Source table reference: "MAKER" | Filter expression: —/— | |
| List of fields (Field Name, Column Name, Data Type) | | |
| Car Maker | C_MAKER | STRING(45) |
| Founding Year | FOUNDED | YEAR |
| Founder | FOUNDER | STRING(80) |
| List of Links (Link Name, Target Structural Container, Linking Expression) | | |
| _to_Brand | Brand | SELF."Car Maker" = TARGET."Car Maker" |
| _to_Contact_Info | Contact Info | SELF."Car Maker" = TARGET."Car Maker" |

| Structural Container: "Brand" | | |
|---|---|---|
| Source table reference: "BRAND" | Filter expression: —/— | |
| List of fields (Field Name, Column Name, Data Type) | | |
| Car Maker | C_MAKER | STRING(45) |
| Car Brand | C_BRAND | STRING(45) |
| Launching Year | L_YEAR | YEAR |
| List of Links (Link Name, Target Structural Container, Linking Expression) | | |
| _to_Car_Maker | Car Maker | SELF."Car Maker" = TARGET."Car Maker" |
| _to_Model | Model | SELF."Car Maker" = TARGET."Car Maker" AND SELF."Car Brand" = TARGET."Car Brand" |

| Structural Container: "Model" | | |
|---|---|---|
| Source table reference: "MODEL" | Filter expression: —/— | |
| List of fields (Field Name, Column Name, Data Type) | | |
| Car Maker | C_MAKER | STRING(45) |
| Car Brand | C_BRAND | STRING(45) |
| Car Model | C_MODEL | STRING(45) |
| Vehicle Category | CATEG | STRING(30) |
| List of Links (Link Name, Target Structural Container, Linking Expression) | | |
| _to_Brand | Brand | SELF."Car Maker" = TARGET."Car Maker" AND SELF."Car Brand" = TARGET."Car Brand" |
| _to_Model_Variant | Model Variant | SELF."Car Maker" = TARGET."Car Maker" AND SELF."Car Brand" = TARGET."Car Brand" AND SELF."Car Model" = TARGET."Car Model" |
| _to_Model_Description | Model Description | SELF."Car Maker" = TARGET."Car Maker" AND SELF."Car Brand" = TARGET."Car Brand" AND SELF."Car Model" = TARGET."Car Model" |

| Structural Container: "Model Variant" | | |
|---|---|---|
| Source table reference: "VARIANT" Filter expression: —/— | | |
| List of fields (Field Name, Column Name, Data Type) | | |
| Car Maker | C_MAKER | STRING(45) |
| Car Brand | C_BRAND | STRING(45) |
| Car Model | C_MODEL | STRING(45) |
| Car Model Variant | C_VARIANT | STRING(45) |
| Horsepower | POWER | INTEGER |
| Fuel Efficiency | MPG | DECIMAL(5.2) |
| Number of Seats | SEATS | INTEGER |
| List of Links (Link Name, Target Structural Container, Linking Expression) | | |
| _to_Model | Model | SELF."Car Maker" = TARGET."Car Maker" AND SELF."Car Brand" = TARGET."Car Brand" AND SELF."Car Model" = TARGET."Car Model" |
| _to_Car | Car | SELF."Car Maker" = TARGET."Car Maker" AND SELF."Car Brand" = TARGET."Car Brand" AND SELF."Car Model" = TARGET."Car Model" AND SELF."Car Model Variant" = TARGET."Model Variant" |

| Structural Container: "Model Description" | | |
|---|---|---|
| Source table reference: "MODEL_TEXT" | Filter expression: LANGU = $P_LOGON_LANGUAGES | |
| List of fields (Field Name, Column Name, Data Type) | | |
| Car Maker | C_MAKER | STRING(45) |
| Car Brand | C_BRAND | STRING(45) |
| Car Model | C_MODEL | STRING(45) |
| Name of the Car Model | NAME | STRING(60) |
| Description of the Car Model | DESCR | STRING(2000) |
| List of Links (Link Name, Target Structural Container, Linking Expression) | | |
| _to_Model | Model | SELF."Car Maker" = TARGET."Car Maker" AND SELF."Car Brand" = TARGET."Car Brand" AND SELF."Car Model" = TARGET."Car Model" |

| Structural Container: "Contact Info" | | |
|---|---|---|
| Source table reference: "CONTACT" | Filter expression: VALID_FROM <= $P_CURRENT_DATE$ AND VALID_TO >= $P_CURRENT_DATE$ | |
| List of fields (Field Name, Column Name, Data Type) | | |
| Car Maker | C_MAKER | STRING(45) |
| Mailing Address | ADDRESS | STRING(200) |
| Telephone Number | PHONE | PHONE_NUMBER |
| E-Mail Address | EMAIL | EMAIL_ADDRESS |
| List of Links (Link Name, Target Structural Container, Linking Expression) | | |
| _to_Car_Maker | Car Maker | SELF."Car Maker" = TARGET."Car Maker" |

Example 9—Example Search Enabling Containers

As described herein, a generic database search model has a corresponding search enabling container, which can be linked to structural containers. Generally, a search enabling container can contain search specifics, such as information specifying the format of search results and/or defining the scope of data search. In addition, information about the structural relationship of the objects (like the establishing of a source table reference or the establishing of a link to another structural container) can be separate from the search enabling container. For example, the search enable container can be devoid of or contain no information about the structural relationship of the objects.

In some embodiments, each search enabling container belongs to a specific generic database search model. Conversely, each generic database search model can correspond to a specific search enabling container. In other words, there can be a one-to-one relationship between the generic database search models and the search enabling containers. For example, FIG. 4 shows three search enabling containers "Employees" 410, "Cars" 430 and "Car Makers" 470 corresponding to three generic database search models for data search of "Employees," "Cars," and "Car Makers," respectively.

Figure 6:
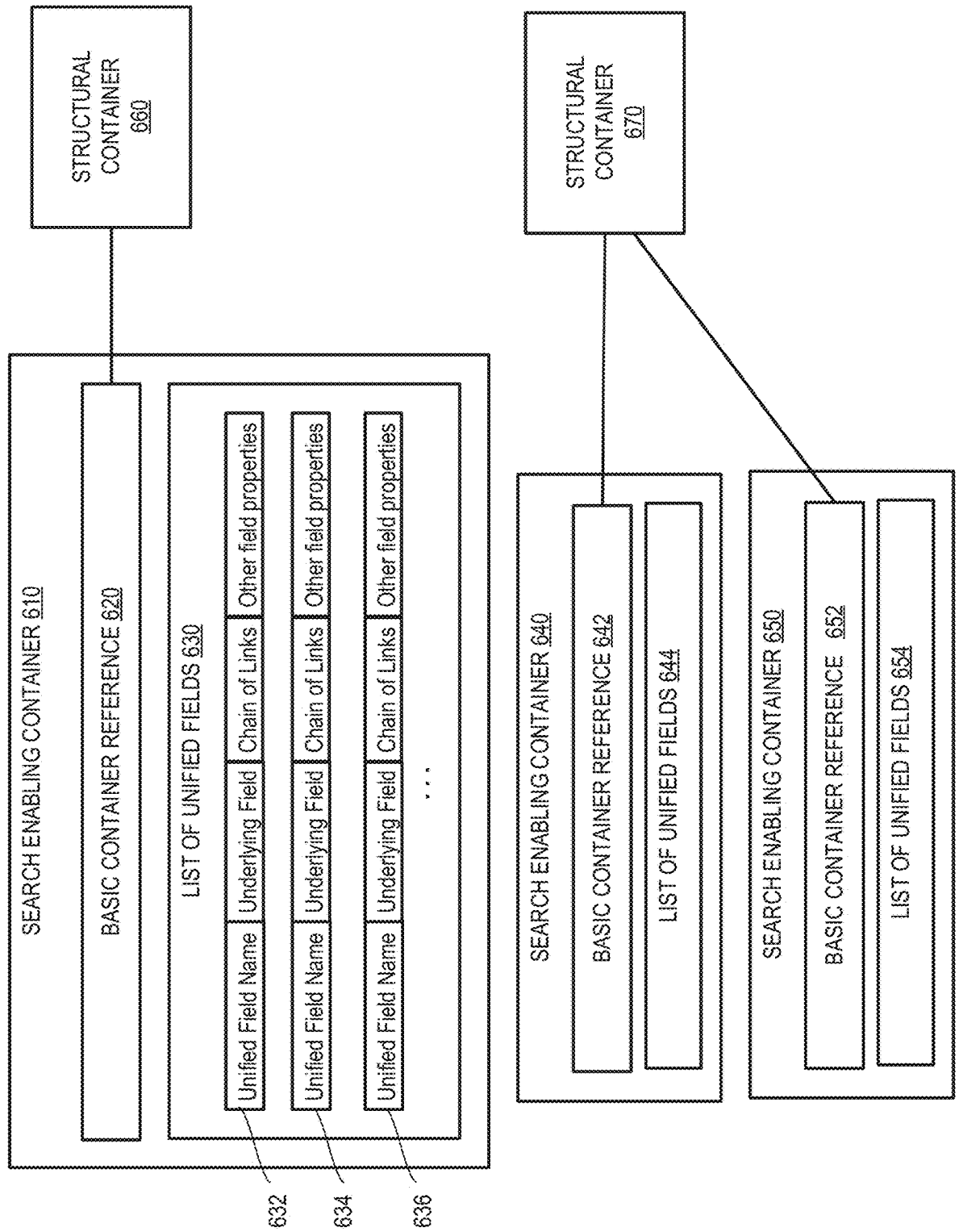
FIG. 6 is a diagram illustrating an example construct of search enabling containers

In certain embodiments, as illustrated in FIG. 6, a search enabling container 610 can include a basic container reference 620 which specifies an underlying primary structural container, e.g., 660. The search enabling container 610 can also include a list of unified fields 630 (e.g., 632, 634, 636, etc.). Each unified field in the list 630 can include a plurality of search-specific characteristics or properties such as "Relevance to Search Response," "Formatting Details," "Relevance to Freestyle Search," "Relevance to Advanced Search," "Relevance to Facetted Search," "Support of Auto Completion," "Degree of Fuzziness," etc., as described below.

As described herein, the basic container reference of a search enabling container points to a primary structural container, which is one of the structural containers that represents the most important object of the corresponding generic database search model (e.g., "Employee" 420 is the primary structural container for the generic database search model for employees, "Car" 450 is the primary structural container for the generic database search model for cars, etc.). Thus, as illustrated in FIG. 4, the basic container reference of the search enabling container "Employees" 410 points to the primary structural container "Employee" 420, the basic container reference of the search enabling container "Cars" 430 points to the primary structural container "Car" 450, and the basic container reference of the search enabling container "Car Makers" 470 points to the primary structural container "Car Maker" 480.

As described herein, it is to be understood that the name of the search enabling container, the name of the corresponding generic database search model, and the name of the referenced primary structural container may or may not be the same or required to be similar, in part because search enabling containers, generic database search models, and primary structural containers are different artifacts. For example, the generic database search model for cars can be named as "AUTOMOBILE" or "Vehicles," or the like.

As described herein, a search enabling container is linked to exactly one specific primary structural container. On the other hand, one specific structural container may be linked to and serve as the primary structural container for multiple search enabling containers. For example, as illustrated in FIG. 6, while the structural container 660 is the primary structural container referenced only by the search enabling container 610, the structural container 670 serves as the primary structural container referenced by two different search enabling containers 640, 650.

The term "unified fields" emphasizes that there is no differentiation between different field types. That is, all fields contained in the list (e.g., 630) of a search enabling container (e.g., 610) have the same field type. This is in contrast to the hierarchical database search models described above, which distinguish between three field types: node fields, response fields and request fields. On the other hand, different unified fields contained in a search enabling container may vary in terms of their properties and/or usages. For example, while one unified field may be used only to specify a search response (e.g., to specify a format of search results), another unified field may be used only to specify a search request (e.g., to define a scope of data search). Yet another unified field may be used to specify both the search response and the search request, and so on.

As described herein, each unified field in a search enable container is based on a specific field (also referred to as the "underlying field") of a structural container (also referred to as the "relevant structural container"). The relevant structural container can be a primary structural container referenced by the basic container reference of the search enable container, or can be another (i.e., not the primary) structure container. When the underlying field belongs to a relevant structural container other than the primary structural container, the pathway from the primary structural container to the relevant structural container can be specified in the form of a chain of links. For example, the search enabling container "Cars" 430 can have a unified field "Model Name" which is based on field "Name" of the structural container "Model Description" 490. Since "Car" 450 is the primary structural container and "Model Description" 490 is the relevant structural container having the field "Name," the pathway from the primary structural container "Car" to the relevant structural container "Model Description" 490 can be specified as the following chain of links: (1) "Car" 450→"Model Variant" 488; (2) "Model Variant" 488→"Model" 486; and (3) "Model" 486→"Model Description" 490. On the other hand, when the underlying field belongs to the primary structural container, the corresponding chain of links can be deemed empty.

In certain embodiments, the list of fields in a search enabling container can include the following parameters or properties (including Boolean-type control flags):

"Unified Field Name"—This is the name of the unified field, which can be displayed as a part of the search result.

"Underlying Field"—This is the name of the underlying field on which the unified field is based. The underlying field belongs to a relevant structural container.

"Chain of Links—The describes the pathway from the primary structural container to the relevant structural container which contains the underlying field. If the underlying field belongs to the primary structural container, the chain of links is empty.

"Is Relevant to the Title Section of the Response"—"Yes" or "No" (Is the unified field a part of the title of a search hit?)

"Title Response Position Number"—This specifies the position of the unified field within the title section of the search hit. Note: this parameter is only relevant if the unified field is part of the title section.

"Is Relevant to the Non-Title Section of the Response"—"Yes" or "No" (Will the unified field be displayed as a part of the non-title section of a search hit?)

"Non-Title Response Position Number"—This specifies the position of the unified field within the non-title section of the search hit. Note: this parameter is only relevant if the unified field is part of the non-title section.

"Formatting Details"—For example: Should a date be formatted as YYYY-MM-DD or YYYY/MM/DD or MM/DD/YYYY or YYYY-MM/DD or DD.M-M.YYYY, or others?

"Is relevant to Freestyle Search"—"Yes" or "No" (Is the unified field considered by a freestyle search? A freestyle search can be a Google like search across all freestyle-search-relevant unified fields for a quick and easy search experience.

"Relevance to Freestyle Search"—Between 0% and 100% (How relevant is a match of a search term in this unified field? For example, a match in the freestyle-relevant unified field "Employee's Name" may be more relevant than a match in the freestyle-relevant unified field "Founder of the Manufacturer of the Employee's Company Car."

"Is Relevant to Advanced Search"—"Yes" or "No" (Is the unified field available for an advanced search? An advanced search can be a fine-granular search with detailed search criteria for experienced domain experts.

"Is Relevant to Facetted Search"—"Yes" or "No" (Does the unified field support a facetted search? A facetted search can allow the targeted restriction of the current search result set based on the value distribution of the unified fields.

"Is Relevant to Auto Completion"—"Yes" or "No" (Does the unified field provide the auto completion feature? Auto completion means that the enterprise search can predict the rest of the search term when a user is typing.)

"Degree of Fuzziness"—Between 0% and 100% (How tolerant is this unified field with respect to typing errors of the search terms?)

As examples, the components of the 3 search enabling containers shown in FIG. 4 are listed below (notation "–/–" means empty).

| | |
|---|---|
| Search Enabling Container: "Employees" | Basic Container Reference: "Employee" |
| Unified Field Name: "Name of Employee" | Underlying Field: "Name" |
| Chain of Links | —/— |
| Is Relevant to the Title Section of the Response | Yes |
| Title Response Position Number | 1 |
| Is Relevant to the Non-Title Section of the Response | No |
| Non-Title Response Position Number | 0 |
| Formatting Details | —/— |
| Is relevant to Freestyle Search | Yes |
| Relevance to Freestyle Search | 95% |
| Is Relevant to Advanced Search | Yes |
| Is Relevant to Facetted Search | No |
| Is Relevant to Auto Completion | No |
| Degree of Fuzziness | 10% |
| Unified Field Name: "Employee's DOB" | Underlying Field: "Date of Birth" |
| Chain of Links | "_to_Personal_Details" |
| Is Relevant to the Title Section of the Response | No |
| Title Response Position Number | 0 |
| Is Relevant to the Non-Title Section of the Response | Yes |
| Non-Title Response Position Number | 1 |
| Formatting Details | MM/DD/YYYY |
| Is relevant to Freestyle Search | No |
| Relevance to Freestyle Search | 0% |
| Is Relevant to Advanced Search | Yes |
| Is Relevant to Facetted Search | Yes |
| Is Relevant to Auto Completion | No |
| Degree of Fuzziness | 0% |
| Unified Field Name: "Employee's SSN" | Underlying Field: "Social Security Number" |
| Chain of Links | "_to_Personal_Details" |
| Is Relevant to the Title Section of the Response | Yes |
| Title Response Position Number | 2 |
| Is Relevant to the Non-Title Section of the Response | No |
| Non-Title Response Position Number | 0 |
| Formatting Details | SSN_FORMAT |
| Is relevant to Freestyle Search | Yes |
| Relevance to Freestyle Search | 100% |
| Is Relevant to Advanced Search | Yes |
| Is Relevant to Facetted Search | No |
| Is Relevant to Auto Completion | No |
| Degree of Fuzziness | 0% |
| Unified Field Name: "License Plate of Company Car" | Underlying Field: "License Plate" |
| Chain of Links | "_to_Car" |
| Is Relevant to the Title Section of the Response | No |
| Title Response Position Number | 0 |
| Is Relevant to the Non-Title Section of the Response | Yes |
| Non-Title Response Position Number | 2 |
| Formatting Details | —/— |
| Is relevant to Freestyle Search | Yes |
| Relevance to Freestyle Search | 80% |
| Is Relevant to Advanced Search | Yes |
| Is Relevant to Facetted Search | No |
| Is Relevant to Auto Completion | No |
| Degree of Fuzziness | 15% |
| Unified Field Name: "Model Name of Company Car" | Underlying Field: "Name of the Car Model" |
| Chain of Links | "_to_Car"."_to_Model_Variant". "_to_Model"."_to_Model_Description" |
| Is Relevant to the Title Section of the Response | No |
| Title Response Position Number | 0 |
| Is Relevant to the Non-Title Section of the Response | Yes |
| Non-Title Response Position Number | 3 |
| Formatting Details | —/— |
| Is relevant to Freestyle Search | Yes |
| Relevance to Freestyle Search | 45% |
| Is Relevant to Advanced Search | Yes |
| Is Relevant to Facetted Search | Yes |
| Is Relevant to Auto Completion | Yes |
| Degree of Fuzziness | 30% |

-continued

| | |
|---|---|
| Unified Field Name: "Color of Company Car"<br>Chain of Links | Underlying Field: "Color"<br>"_to_Car" |
| Is Relevant to the Title Section of the Response | No |
| Title Response Position Number | 0 |
| Is Relevant to the Non-Title Section of the Response | Yes |
| Non-Title Response Position Number | 4 |
| Formatting Details | —/— |
| Is relevant to Freestyle Search | Yes |
| Relevance to Freestyle Search | 20% |
| Is Relevant to Advanced Search | Yes |
| Is Relevant to Facetted Search | Yes |
| Is Relevant to Auto Completion | Yes |
| Degree of Fuzziness | 15% |
| Unified Field Name: "E-Mail of Maker of Company Car"<br>Chain of Links | Underlying Field: "E-Mail Address"<br>"_to_Car". "_to_Model_Variant". "_to_Model".<br>"_to_Brand". "_to_Car_Maker". "_to_Contact_Info" |
| Is Relevant to the Title Section of the Response | No |
| Title Response Position Number | 0 |
| Is Relevant to the Non-Title Section of the Response | Yes |
| Non-Title Response Position Number | 5 |
| Formatting Details | EMAIL_FORMAT |
| Is relevant to Freestyle Search | No |
| Relevance to Freestyle Search | 0% |
| Is Relevant to Advanced Search | No |
| Is Relevant to Facetted Search | No |
| Is Relevant to Auto Completion | No |
| Degree of Fuzziness | 0% |

| | |
|---|---|
| Search Enabling Container: "Cars"<br>Unified Field Name: "License Plate"<br>Chain of Links | Basic Container Reference: "Car"<br>Underlying Field: "License Plate"<br>—/— |
| Is Relevant to the Title Section of the Response | Yes |
| Title Response Position Number | 1 |
| Is Relevant to the Non-Title Section of the Response | No |
| Non-Title Response Position Number | 0 |
| Formatting Details | —/— |
| Is relevant to Freestyle Search | Yes |
| Relevance to Freestyle Search | 100% |
| Is Relevant to Advanced Search | Yes |
| Is Relevant to Facetted Search | No |
| Is Relevant to Auto Completion | No |
| Degree of Fuzziness | 0% |
| Unified Field Name: "Model Name"<br>Chain of Links | Underlying Field: "Name of the Car Model"<br>"_to_Model_Variant"."_to_Model"."_to_Model_Description" |
| Is Relevant to the Title Section of the Response | Yes |
| Title Response Position Number | 2 |
| Is Relevant to the Non-Title Section of the Response | No |
| Non-Title Response Position Number | 0 |
| Formatting Details | —/— |
| Is relevant to Freestyle Search | Yes |
| Relevance to Freestyle Search | 70% |
| Is Relevant to Advanced Search | Yes |
| Is Relevant to Facetted Search | Yes |
| Is Relevant to Auto Completion | Yes |
| Degree of Fuzziness | 20% |
| Unified Field Name: "Color"<br>Chain of Links | Underlying Field: "Color"<br>—/— |
| Is Relevant to the Title Section of the Response | No |
| Title Response Position Number | 0 |
| Is Relevant to the Non-Title Section of the Response | Yes |
| Non-Title Response Position Number | 1 |
| Formatting Details | —/— |
| Is relevant to Freestyle Search | Yes |
| Relevance to Freestyle Search | 30% |

-continued

| | |
|---|---|
| Is Relevant to Advanced Search | Yes |
| Is Relevant to Facetted Search | Yes |
| Is Relevant to Auto Completion | Yes |
| Degree of Fuzziness | 15% |

| | |
|---|---|
| Unified Field Name: "Fuel Efficiency in MPG" | Underlying Field: "Fuel Efficiency" |
| Chain of Links | "_to_Model_Variant" |

| | |
|---|---|
| Is Relevant to the Title Section of the Response | No |
| Title Response Position Number | 0 |
| Is Relevant to the Non-Title Section of the Response | Yes |
| Non-Title Response Position Number | 2 |
| Formatting Details | —/— |
| Is relevant to Freestyle Search | No |
| Relevance to Freestyle Search | 0% |
| Is Relevant to Advanced Search | No |
| Is Relevant to Facetted Search | No |
| Is Relevant to Auto Completion | No |
| Degree of Fuzziness | 0% |

| | |
|---|---|
| Unified Field Name: "Driver's Name" | Underlying Field: "Name" |
| Chain of Links | "_to_Employee" |

| | |
|---|---|
| Is Relevant to the Title Section of the Response | No |
| Title Response Position Number | 0 |
| Is Relevant to the Non-Title Section of the Response | Yes |
| Non-Title Response Position Number | 3 |
| Formatting Details | —/— |
| Is relevant to Freestyle Search | Yes |
| Relevance to Freestyle Search | 95% |
| Is Relevant to Advanced Search | Yes |
| Is Relevant to Facetted Search | No |
| Is Relevant to Auto Completion | Yes |
| Degree of Fuzziness | 20% |

| | |
|---|---|
| Search Enabling Container: "Car Makers" | Basic Container Reference: "Car Maker" |
| Unified Field Name: "Car Maker's Company Name" | Underlying Field: "Car Maker" |
| Chain of Links | —/— |

| | |
|---|---|
| Is Relevant to the Title Section of the Response | Yes |
| Title Response Position Number | 1 |
| Is Relevant to the Non-Title Section of the Response | No |
| Non-Title Response Position Number | 0 |
| Formatting Details | —/— |
| Is relevant to Freestyle Search | Yes |
| Relevance to Freestyle Search | 100% |
| Is Relevant to Advanced Search | Yes |
| Is Relevant to Facetted Search | No |
| Is Relevant to Auto Completion | Yes |
| Degree of Fuzziness | 45% |

| | |
|---|---|
| Unified Field Name: "Founding Year of the Car Manufacturer" | Underlying Field: "Founding Year" |
| Chain of Links | —/— |

| | |
|---|---|
| Is Relevant to the Title Section of the Response | No |
| Title Response Position Number | 0 |
| Is Relevant to the Non-Title Section of the Response | Yes |
| Non-Title Response Position Number | 1 |
| Formatting Details | —/— |
| Is relevant to Freestyle Search | No |
| Relevance to Freestyle Search | 0% |
| Is Relevant to Advanced Search | Yes |
| Is Relevant to Facetted Search | Yes |
| Is Relevant to Auto Completion | No |
| Degree of Fuzziness | 0% |

| | |
|---|---|
| Unified Field Name: "Car Maker's Mailing Address" | Underlying Field: "Mailing Address" |
| Chain of Links | "_to_Contact_Info" |

| | |
|---|---|
| Is Relevant to the Title Section of the Response | No |
| Title Response Position Number | 0 |
| Is Relevant to the Non-Title Section of the Response | Yes |
| Non-Title Response Position Number | 2 |
| Formatting Details | —/— |
| Is relevant to Freestyle Search | No |

-continued

| | |
|---|---|
| Relevance to Freestyle Search | 0% |
| Is Relevant to Advanced Search | No |
| Is Relevant to Facetted Search | No |
| Is Relevant to Auto Completion | No |
| Degree of Fuzziness | 0% |
| Unified Field Name: "Model Name" | Underlying Field: "Name of the Car Model" |
| Chain of Links | "_to_Brand"."_to_Model"."_to_Model_Description" |
| Is Relevant to the Title Section of the Response | No |
| Title Response Position Number | 0 |
| Is Relevant to the Non-Title Section of the Response | No |
| Non-Title Response Position Number | 0 |
| Formatting Details | —/— |
| Is relevant to Freestyle Search | Yes |
| Relevance to Freestyle Search | 80% |
| Is Relevant to Advanced Search | Yes |
| Is Relevant to Facetted Search | No |
| Is Relevant to Auto Completion | Yes |
| Degree of Fuzziness | 35% |
| Unified Field Name: "Model Variant" | Underlying Field: "Car Model Variant" |
| Chain of Links | "_to_Brand"."_to_Model"."_to_Model_Variant" |
| Is Relevant to the Title Section of the Response | No |
| Title Response Position Number | 0 |
| Is Relevant to the Non-Title Section of the Response | No |
| Non-Title Response Position Number | 0 |
| Formatting Details | —/— |
| Is relevant to Freestyle Search | Yes |
| Relevance to Freestyle Search | 75% |
| Is Relevant to Advanced Search | Yes |
| Is Relevant to Facetted Search | No |
| Is Relevant to Auto Completion | Yes |
| Degree of Fuzziness | 55% |

Example 10—Example Differences Between Hierarchical Database Search Models and Generic Database Search Models There are a number of differences between the hierarchical database search models and the generic database search models.

Structural Containers vs. Nodes

Like nodes of the hierarchical database search models, structural containers of the generic database search models can represent objects.

However, in contrast to a node, a structural container is not part of a specific database search model. Instead, the structural containers are self-contained, stand-alone artifacts which exist independently from specific database search models. For example, the node "Model Variant" 388 (see e.g., FIG. 3) is part of the database search model "CAR MAKER" 370. Once the database search model "CAR MAKER" 370 is deleted, the contained node "Model Variant" 388 would be destroyed automatically. In contrast, the structural container "Model Variant" 488 (see e.g., FIG. 4) does not belong to any specific database search model (e.g., it is independent of the database search model "Car Maker"). Thus, even if the database search model "Car Maker" is deleted, the independent structural container "Model Variant" 488 would continue to survive and could still be used by other database search models.

While nodes are divided into root nodes and inner nodes (based on the objects' relative importance) and organized in a hierarchical structure (see e.g., FIG. 3), there is no such differentiation of structural containers, which can be organized in an arbitrary graph it a "flat" structure (see e.g., FIG. 4). Thus, when creating generic database search models, there is no need to classify the objects into more and less important ones or organize the structural containers in a tree-like structure, thereby simplifying the task of search model creation.

Filter Expressions vs. Node Filters and Node Limiters

Like node filters and node limiters of hierarchical database search models, filter expressions in generic database search models can be used to filter or limit rows of the underlying database table.

However, in contrast to hierarchical database search models where a node may have many assigned node filters and node limiters, a structural container can have only one single filter expression. Such single filter expression not only can make the database search model easier to understand, but also allows more efficient processing by computer systems (compared to processing a collection of partial expressions).

In contrast to hierarchical database search models, generic database search models remove the distinction between node filters and node limiters. All partial expressions required by the node filters and node limiters can be built together homogeneously to form a single Boolean expression. Thus, when creating the generic database search models, there is no need to classify the partial Boolean expressions into node filters and node limiters, thereby simplifying the creation and/or modification of database search models.

As noted above, a node of a hierarchical database search model may have multiple node filters and node limiters which are logically combined according to some implicit rules. In contrast, a filter expression (which is a single and complete Boolean expression) does not make use of any implicit rules. A filter expression can comply with any well-known syntax of Boolean expressions. This makes the generic database search models easier to understand and simplifies the creation and/or modification of database search models.

Further, node filters and node limiters of hierarchical database search models only allow simple comparison operations in the form of COLUMN=VALUE as well as simple (implicitly triggered) logical-AND/OR-connections. In contrast, a filter expression allows the usage of arbitrary logical operators (e.g., AND, OR, XOR, NOT etc.) in any arbitrary nesting operations. This allows a clear and compact notation of the filter expressions, which makes it easier to create and/or adjust database search models. Moreover, easy-to-understand filter expressions also imply easy-to-understand database search models.

List of Fields vs. Node Fields

Node fields in hierarchical database search models are required to be search-relevant, that is, each node field must be the basis for a response field and/or a request field, or the node field must be referenced by an edge field mapping and/or an edge fixed value. In contrast, the members of the list of fields are only required to be potentially search-relevant. In other words, the list may include some fields that are not actually search-relevant. As such, when creating or defining a structural container, there is no need to predict the future usage of all fields. In other words, when creating or defining a structural container, it is not required to know if (or if not) a specific field would be used as basis for a response field and/or request field. The structural containers are limited to structural information only—search specifics are ignored/excluded intentionally. Such intentional separation between structural information and search specifics can simplify the creation and/or modification of database search models.

List of Links vs. Edges

While an edge connects two nodes in a hierarchical database search model, a link included in the list of links of a structural container connects two structural containers.

In contrast to edges which are undirected, links are directional: An edge which connects "P" and "Q" also connects "Q" and "P." In contrast, a link pointing from "P" to "Q" does not point from "Q" to "P". For the way back ("Q"→"P"), an additional link is needed, which belongs to the list of links of the structural container "Q."

While an edge connects two nodes in a hierarchical database search model, the edge does not belong to any of these two nodes. For example, the edge 360 connecting the nodes "Car" 350 and "Model Variant" 388 (see e.g., FIG. 3) does not belong to either node. In contrast, each link in a generic database search model belongs to a specific structural container. For example, the link which points from the structural container "Car" 450 to the structural container "Model Variant" 488 belongs to the structural container "Car" 450, and the link which points from the structural container "Model Variant" 488 to the structural container "Car" 450 belongs to the structural container "Model Variant" 488. Such clear and unique assignment of links to respective structural containers can simply the creation and/or modification of structural containers, and consequently, the creation and/or modification of the generic database search models. In addition, the execution of consistency checks regarding structural containers can be simplified because all parts of a structural container are explicitly known and there are no floating structural-relevant artifacts that are not assigned to a specific structural container.

As noted above, in hierarchical database search models, how two nodes are connected by an edge can be expressed by edge fixed values and/or edge field mappings. Multiple edge fixed values and edge field mappings may refer to the same edge. Such edge fixed values and edge field mappings can be logically combined according to some implicit rules. In contrast, the linking expression (which is a single and complete Boolean expression) in generic database search models does not make use of any implicit rules. The linking expression can comply with any well-known syntax of Boolean expressions. Thus, it makes the generic database search models easier to understand, and it can simplify the creation and/or modification of the generic database search models.

Further, edge fixed values of hierarchical database search models only support simple comparison operations in the form of FIELD=VALUE and simple (implicitly triggered) logical-AND/OR-connections. Similarly, edge field mappings of hierarchical database search models only allow simple comparison operations in the form of FIELD1=FIELD2 and simple (implicitly triggered) logical-AND-connections. In contrast, a linking expression allows the usage of arbitrary logical operators (e.g., AND, OR, XOR, NOT, etc.) in any arbitrary nesting operations. Such clear and compact notation of the linking expression possible makes it easier to create and/or modify database search models. Such easy-to-understand linking expressions also imply easy-to-understand database search models.

Search Enabling Containers vs. Root Nodes

Similar to the one-to-one relationship between root nodes and hierarchical database search models, there is a one-to-one relationship between search enabling containers and generical database search models.

However, while a root node represents the most important object in a hierarchical database search model, a search enabling container points to a primary structural container, which represents the most important object in a generic database search model. In other words, the search enabling container itself does not represent the search-relevant object; it merely points to a structural container which represents the search-relevant object. Thus, there is a clear separation between the modeling of objects (by structural containers) and the search enabling of the models (by search enabling containers). Such intended separation can greatly simply the creation and/or modification of generic database search models. For example, one development team could focus on the modeling work (e.g., the creation of structural containers), while another development team could focus on the search enabling work (e.g., the creation of search enabling containers).

In addition, while a root node has three different types of fields (e.g., node fields, response fields and request fields), a search enabling container has only one type of fields, i.e., unified fields. In other words, a root node of a hierarchical database search model plays a double role: On the one hand, the root node defines the node fields which are used as basis for response fields and request fields; on the other hand, the root node defines the response fields and request fields which are based on these node fields. In contrast, a search enabling container does not play such a double role. Instead, it just defines the search specifics, but otherwise is free from any structural information like the definition of base/underlying fields. Thus, this intended separation between structural modeling and search enabling can simplify the creation and/or modification of generic database search models.

Further, while a root node may be assigned node filters and node limiters as well as connecting edges, a search enabling container is restricted to the pure search specifics. All structural information is outsourced to the structural containers, thus ensuring a strict separation between structural information and search-specific information.

List of Unified Fields vs. Node/Response/Request Fields

As noted above, the search enabling container's list of unified fields is homogeneous because all entries of this list are of the same type (i.e., unified fields). However, a root node of a hierarchical database search model differentiates between three types of fields: node fields, response fields, and request fields.

For example, for database search model "Car," the "License Plate" should be relevant to freestyle search, and the "License Plate" should be part of the search hit's title section. Based on the generic database search model "Car," the list of unified fields of the search enabling container "Cars" (e.g., 430) can include a unified field "License Plate" with the following characteristics:

Unified Field Name: "License Plate"
Underlying Field: "License Plate"
Chain of Links: empty
Is Relevant to the Title Section of the Response: Yes
Title Response Position Number: 1
Is Relevant to Freestyle Search: Yes
Relevance to Freestyle Search: 100%

In contrast, for a hierarchical database search model "Car," the root node (e.g., 350) can include a node field "License Plate" with the following characteristics:

Name of the node field: "License Plate"
Underlying database table: "CAR"
Underlying table column: "LICENSE"

In addition, the root node "Car" also includes a response field "License Plate" with the information or parameters:

Name of the response field: "License Plate"
Underlying node: "Car" (i.e., the root node itself)
Underlying node field: "License Plate"
Navigation Path: empty (since the response field and its underlying node field belong to the same node)
Is Title Response Field: Yes
Position Number: 1

Moreover, the root node "Car" also includes a request field "License Plate" with the following information or parameters:

Name of the request field: "License Plate"
Underlying node: "Car" (i.e., the root node itself)
Underlying node field: "License Plate"
Navigation Path: empty (since the request field and its underlying node field belong to the same node)
Is Freestyle Search Request Field: Yes
Relevance to Freestyle Search: 100%

Thus, by removing field type differentiation and using unified field, the generic database search models is simpler, easier-to-understand, easier-to-formulate and more compact than the hierarchical database search models.

Further, while the fields of a root node mixes structural information (e.g., name of underlying database table, name of underlying table column, etc.) with search specifics (e.g., relevance to freestyle search, etc.), the unified fields of a search enabling container focus on the search specifics. Such intended separation between structural information from search specifics can simply the creation and/or modification of generic database search models.

Example 11—Example Storage of Structural Containers and Search Enabling Containers As noted above, the generic database search models can be stored in an enterprise search model repository (e.g., 130) and can be retrieved by an enterprise software for execution of data search in an enterprise database.

In some embodiments, the enterprise search model repository can store the metadata of all search models, and such metadata can include all information required to reconstruct the structural containers and search enabling containers that are currently available in the enterprise system.

In some embodiments, three metadata tables can be used to store the metadata about the structural containers. For example, the names of the structural containers, the source table references and the filter expressions can be stored in a first metadata table. The information about fields (e.g., name of the owning structural container, the field name, the column name, and the data type of the field) can be stored in a second metadata table. The information about links (e.g., the name of the owning structural container, the link name, the target structural container, and the linking expression) can be stored in a third metadata table. The filter expressions and the linking expressions may be stored as flat string literals or in another appropriate format (e.g., as abstract syntax trees).

In some embodiments, three additional metadata tables can be used to store the metadata about the search enabling containers. For example, the names of the search enabling containers and the basic container references can be stored in a fourth metadata table. The information about unified fields (e.g., the name of the owning search enabling container, the unified field name, the underlying field, the "Relevance to Title Section of the Response," the "Title Response Position Number," the "Relevance to Non-Title Section of the Response," the "Non-Title Response Position Number," the "Formatting Details," the "Relevance to Freestyle Search," the "Relevance to Advanced Search," the "Relevance to Facetted Search," the "Support of Auto Completion," the "Degree of Fuzziness") can be stored in fifth metadata table. The information about the chains of links (e.g., the name of the owning search enabling container, the name of the owning/corresponding unified field, the position number of the link inside of the chain of links, and the name of the link) can be stored in a sixth metadata table.

As examples, the tables below show three metadata tables corresponding to the structural containers and three metadata tables about the search enabling containers ("–/–" denotes empty). It is to be understood that in other embodiments, more than three or less than three metadata tables can be used to store the metadata about the structural containers.

| Structural Containers: Metadata Table 1 | | |
|---|---|---|
| Structural Container | Source Table Reference | Filter Expression |
| Employee | EMPL | —/— |
| Personal Details | EMPL_DETAILS | —/— |
| Speeding Ticket | TICKET | TYPE = 'S' AND BINDING = 'Y' AND VALID_TO >= $P_CURRENT_DATE$ |
| Parking Ticket | TICKET | TYPE = 'P' AND BINDING = 'Y' AND VALID_TO >= $P_CURRENT_DATE$ |
| Car | CAR | —/— |
| Sales Receipt | COST | CANCELED = 'N' |
| Invoice | COST | CANCELED = 'N' |
| . . . | . . . | . . . |

| Structural containers: Metadata Table 2 | | | |
|---|---|---|---|
| Structural Container | Field | Underlying Column | Data Type |
| Employee | Employee ID | ID | STRING(10) |
| Employee | Name | NAME | STRING(60) |
| Employee | Department | DEPT | STRING(40) |
| Personal Details | Personnel Number | EMPL_ID | STRING(10) |
| Personal Details | Date of Birth | DOB | DATE |
| Personal Details | Place of Birth | BIRTHPLACE | STRING(90) |
| Personal Details | Social Security Number | SSN | STRING(9) |
| ... | ... | ... | |

| Structural Containers: Metadata Table 3 | | | |
|---|---|---|---|
| Structural Container | Link | Target | Linking Expression |
| Employee | _to_Personal_Details | Personal Details | SELF."Employee ID" = TARGET."Personnel Number" |
| Employee | _to_Speeding_Ticket | Speeding Ticket | SELF."Employee ID" = TARGET."Employee ID" |
| Employee | _to_Parking_Ticket | Parking Ticket | SELF."Employee ID" = TARGET."Employee ID" |
| Employee | _To_Car | Car | SELF."Employee ID" = TARGET."Driver's Employee ID" |
| Personal Details | _to_Employee | Employee | SELF."Personnel Number" = TARGET."Employee ID" |
| Speeding Ticket | _to_Employee | Employee | SELF."Employee ID" = TARGET."Employee ID" |
| Parking Ticket | _to_Employee | Employee | SELF."Employee ID" = TARGET."Employee ID" |
| ... | ... | ... | |

| Search Enabling Containers: Metadata Table 4 | |
|---|---|
| Search Enabling Container | Basic Container Reference |
| Employees | Employee |
| Cars | Car |
| Car Makers | Car Maker |

| Search Enabling Container | Unified Field Name | Underlying Field | Is Relevant to the Title Section of the Response | Title Response Position Number | Is Relevant to the Non-Title Section of the Response | ... |
|---|---|---|---|---|---|---|
| Employees | Name of Employee | Name | Yes | 1 | No | ... |
| Employees | Employee's DOB | Date of Birth | No | 0 | Yes | ... |
| Employees | Employee's SSN | Social Security Number | Yes | 2 | No | ... |
| Employees | License Plate of Company Car | License Plate | No | 0 | Yes | ... |
| Employees | Model Name of Company Car | Name of the Car Model | No | 0 | Yes | ... |
| Employees | Color of Company Car | Color | No | 0 | Yes | ... |
| Employees | E-Mail of Maker of Company Car | E-Mail Address | No | 0 | Yes | ... |
| ... | ... | ... | ... | ... | ... | ... |

Example 12—Example Advantages

A number of advantages can be achieved via the technology described herein. For example, as explained above, because the generic database search models clearly and strictly separating structural information from search specifics, they not only can simplify the creation of new database search models, but also can simplify the maintenance, adjustment, modification, and/or correction of existing database search models. Specifically, the generic database search models allow division of labor by separating the structural modeling from the search enabling (e.g., one team can focus on the construction of structural containers while another team could focus on the creation of search enabling containers).

By introducing modeling artifacts (e.g., the structural containers) that are independent from a concrete database search model, the task of creating, maintaining, adjusting, modifying, and/or correcting database search models can be simplified. For example, deletion of individual database search models can be simplified because the independent modeling artifacts (e.g., the structural containers) can "survive" the deletion while other database search models are not affected by the deletion. Compared to the hierarchical database search models, the generic database search models also have the following, non-exhaustive list of advantages:

Simplify the creation of new database search models by renouncing the differentiation between more important objects and less important ones as in hierarchical database search models.

Simplify the creation of new database search models by not enforcing a hierarchical tree structure.

Improve and/or enhance modeling options by allowing powerful arbitrary Boolean expressions for defining filters and for defining linking expressions.

Simplify the creation of new database search models by allowing arbitrary Boolean expressions instead of relying on difficult-to-understand implicit rules.

Simplify the maintenance, adjustment, modification, and/or correction of existing database search models by allowing arbitrary Boolean expressions instead of relying on difficult-to-understand implicit rules.

Simplify the creation of new database search models by renouncing a difficult-to-understand differentiation between node filters and node limiters.

Simplify the creation, maintenance, adjustment, modification, and/or correction of database search models by using a powerful single filter expression instead of a difficult-to-understand mixture of several node filters and multiple node limiters.

Simplify the creation, maintenance, adjustment, modification, and/or correction of database search models by using a powerful single linking expression instead of a difficult-to-understand mixture of several edge fixed values and multiple edge field mappings.

Simplify the creation, maintenance, adjustment, modification, and/or correction of database search models by using the standardized, well-known, clear and compact syntax of Boolean expressions (e.g., easy-to-understand filter expressions and easy-to-understand linking expressions imply easy-to-understand database search models).

Decrease redundancy by introducing reusable structural database search model components (e.g., the structural containers).

Decrease the maintenance efforts regarding the adjustment, modification, correction, and/or enhancement of database search models by reducing redundancy.

Decrease the error rate of creation, maintenance, adjustment, modification, and/or correction of database search models by reducing redundancy.

Simplify the creation, maintenance, adjustment, modification, and/or correction of database search models by unifying several field types to a single one (e.g., the unified field).

Decrease the error rate and speed up the tasks of creation, maintenance, adjustment, modification, and/or correction of database search models by using a simplified and generic database search model representation.

Support the transformation of hierarchical database search models into a new future-proof format by providing a simplified, optimized, and generic database search model representation.

Example 13—Example Computing Systems

Figure 7:
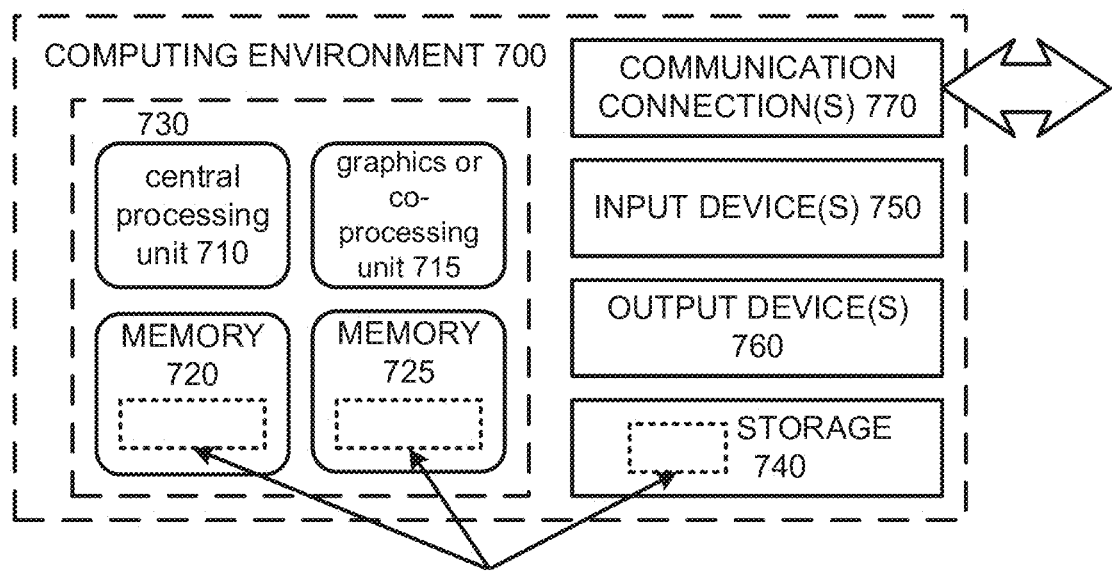
FIG. 7 is a block diagram of an example computing system in which described embodiments can be implemented.

FIG. 7 depicts an example of a suitable computing system 700 in which the described innovations can be implemented. The computing system 700 is not intended to suggest any limitation as to scope of use or functionality of the present disclosure, as the innovations can be implemented in diverse computing systems.

With reference to FIG. 7, the computing system 700 includes one or more processing units 710, 715 and memory 720, 725. In FIG. 7, this basic configuration 730 is included within a dashed line. The processing units 710, 715 execute computer-executable instructions, such as for implementing the features described in the examples herein. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 7 shows a central processing unit 710 as well as a graphics processing unit or co-processing unit 715. The tangible memory 720, 725 can be volatile memory (e.g., registers, cache, RAM), non-volatile memory (e.g., ROM, EEPROM, flash memory, etc.), or some combination of the two, accessible by the processing unit(s) 710, 715. The memory 720, 725 stores software 780 implementing one or more innovations described herein, in the form of computer-executable instructions suitable for execution by the processing unit(s) 710, 715.

A computing system 700 can have additional features. For example, the computing system 700 includes storage 740, one or more input devices 750, one or more output devices 760, and one or more communication connections 770, including input devices, output devices, and communication connections for interacting with a user. An interconnection mechanism (not shown) such as a bus, controller, or network interconnects the components of the computing system 700. Typically, operating system software (not shown) provides an operating environment for other software executing in the computing system 700, and coordinates activities of the components of the computing system 700.

The tangible storage 740 can be removable or non-removable, and includes magnetic disks, magnetic tapes or cassettes, CD-ROMs, DVDs, or any other medium which can be used to store information in a non-transitory way and which can be accessed within the computing system 700. The storage 740 stores instructions for the software 280 implementing one or more innovations described herein.

The input device(s) 750 can be an input device such as a keyboard, mouse, pen, or trackball, a voice input device, a scanning device, touch device (e.g., touchpad, display, or the like) or another device that provides input to the computing system 700. The output device(s) 760 can be a display, printer, speaker, CD-writer, or another device that provides output from the computing system 700.

The communication connection(s) 770 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the context of computer-executable instructions, such as those included in program modules, being executed in a computing system on a target real or virtual processor (e.g., which is ultimately executed on one or more hardware processors). Generally, program modules or components include routines, programs, libraries, objects, classes, components, data structures, etc. that perform particular tasks or implement particular abstract data types. The functionality of the program modules can be combined or split between program modules as desired in various embodiments. Computer-executable instructions for program modules can be executed within a local or distributed computing system.

For the sake of presentation, the detailed description uses terms like "determine" and "use" to describe computer operations in a computing system. These terms are high-level descriptions for operations performed by a computer, and should not be confused with acts performed by a human being. The actual computer operations corresponding to these terms vary depending on implementation.

Example 14—Computer-Readable Media

Any of the computer-readable media herein can be non-transitory (e.g., volatile memory such as DRAM or SRAM, nonvolatile memory such as magnetic storage, optical storage, or the like) and/or tangible. Any of the storing actions described herein can be implemented by storing in one or more computer-readable media (e.g., computer-readable storage media or other tangible media). Any of the things (e.g., data created and used during implementation) described as stored can be stored in one or more computer-readable media (e.g., computer-readable storage media or other tangible media). Computer-readable media can be limited to implementations not consisting of a signal.

Any of the methods described herein can be implemented by computer-executable instructions in (e.g., stored on, encoded on, or the like) one or more computer-readable media (e.g., computer-readable storage media or other tangible media) or one or more computer-readable storage devices (e.g., memory, magnetic storage, optical storage, or the like). Such instructions can cause a computing device to perform the method. The technologies described herein can be implemented in a variety of programming languages.

Example 15—Example Cloud Computing Environment

Figure 8:
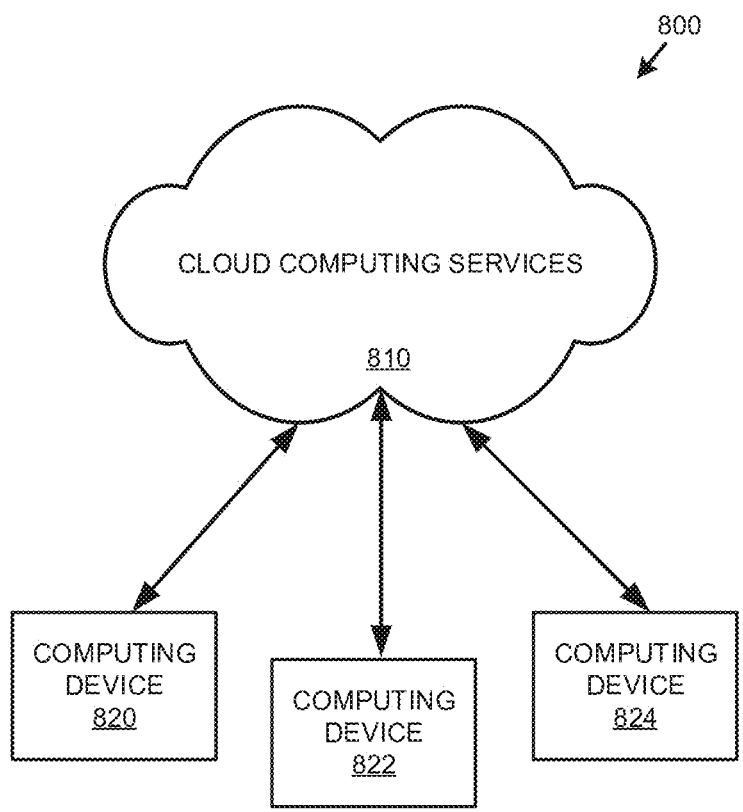
FIG. 8 is a block diagram of an example cloud computing environment that can be used in conjunction with the technologies described herein.

FIG. 8 depicts an example cloud computing environment 800 in which the described technologies can be implemented, including, e.g., the system disclosed above and other systems herein. The cloud computing environment 800 comprises cloud computing services 810. The cloud computing services 810 can comprise various types of cloud computing resources, such as computer servers, data storage repositories, networking resources, etc. The cloud computing services 810 can be centrally located (e.g., provided by a data center of a business or organization) or distributed (e.g., provided by various computing resources located at different locations, such as different data centers and/or located in different cities or countries).

The cloud computing services 810 are utilized by various types of computing devices (e.g., client computing devices), such as computing devices 820, 822, and 823. For example, the computing devices (e.g., 820, 822, and 824) can be computers (e.g., desktop or laptop computers), mobile devices (e.g., tablet computers or smart phones), or other types of computing devices. For example, the computing devices (e.g., 820, 822, and 824) can utilize the cloud computing services 810 to perform computing operations (e.g., data processing, data storage, and the like).

In practice, cloud-based, on-premises-based, or hybrid scenarios can be supported.

Example 16—Example Implementations

Although the operations of some of the disclosed methods are described in a particular, sequential order for convenient presentation, such manner of description encompasses rearrangement, unless a particular ordering is required by specific language set forth herein. For example, operations described sequentially can in some cases be rearranged or performed concurrently.

Example 17—Example Embodiments

Any of the following embodiments can be implemented.

Clause 1. A computer-implemented method comprising:
one or more database search models configured to search data contained in a plurality of database tables,
wherein the one or more database search models comprise a plurality of structural containers and one or more search enabling containers,
wherein the plurality of structural containers represent objects having a structural relationship and contain property data of the objects, wherein the property data of the objects are obtained from the plurality of database tables, wherein the plurality of structural containers can be shared by the one or more database search models, and
wherein the one or more search enabling containers correspond to the one or more database search models and specify a scope for searching data and a format for presenting search results.

Clause 2. The system of clause 1, wherein the plurality of structural containers comprise respective source table references specifying underlying database tables from which the property data of the objects represented by the plurality of structural containers are obtained.

Clause 3. The system of clause 2, wherein the plurality of structural containers comprise respective Boolean expressions configured for filtering rows of the underlying database tables.

Clause 4. The system of any one of clauses 2-3, wherein the plurality of structural containers comprise respective lists of fields that correspond to respective columns of the underlying database tables.

Clause 5. The system of any one of clauses 1-4, wherein the plurality of structural containers comprise respective lists of links, wherein a list of links of a structural container semantically relates the structural container to other structural containers.

Clause 6. The system of clause 5, wherein a link of the structural container comprises a linking expression specifying a relationship between one or more fields of the structural container and one or more fields of one of the other structural containers.

Clause 7. The system of any one of clauses 1-6, wherein a search enabling container comprises a basic container reference which specifies a primary structural container, wherein the primary structural container is one of the plurality of structural containers.

Clause 8. The system of any one of clauses 1-7, wherein the search enabling container comprises a list of unified fields, wherein a unified field in the search enabling container corresponds to an underlying field in one of the plurality of structural containers.

Clause 9. The system of clause 8, wherein the unified field in the search enabling container comprises a chain of links connecting the primary structural container to the structural container containing the underlying field.

Clause 10. The system of any one of clauses 1-9, wherein information contained in the plurality of structural containers and one or more search enabling containers are stored in one or more metadata tables.

Clause 11. A database search model stored in one or more computer readable media and configured for data search in a plurality of database tables, the database search model comprising:
 a plurality of structural containers and a search enabling container,
 wherein the plurality of structural containers represent objects having a structural relationship and contain property data of the objects, wherein the property data of the objects are obtained from the plurality of database tables, wherein the plurality of structural containers specifies neither a scope of the data search nor a format of search results,
 wherein the search enabling container specifies the scope of the data search and the format of the search results.

Clause 12. The database search model of clause 11, wherein the plurality of structural containers comprise respective source table references specifying underlying database tables from which the property data of the objects represented by the plurality of structural containers are obtained.

Clause 13. The database search model of clause 12, wherein the plurality of structural containers comprise respective Boolean expressions configured for filtering rows of the underlying database tables.

Clause 14. The database search model of any one of clauses 12-13, wherein the plurality of structural containers comprise respective lists of fields that correspond to respective columns of the underlying database tables.

Clause 15. The database search model of any one of clauses 11-14, wherein the plurality of structural containers comprise respective lists of links, wherein a list of links of a structural container semantically relates the structural container to other structural containers.

Clause 16. The database search model of clause 15, wherein a link of the structural container comprises a linking expression specifying a relationship between one or more fields of the structural container and one or more fields of one of the other structural containers.

Clause 17. The database search model of any one of clauses 11-16, wherein the search enabling container comprises a basic container reference which specifies a primary structural container, wherein the primary structural container is one of the plurality of structural containers.

Clause 18. The database search model of any one of clauses 11-17, wherein the search enabling container comprises a list of unified fields, wherein a unified field in the search enabling container corresponds to an underlying field in one of the plurality of structural containers.

Clause 19. The database search model of clause 18, wherein the unified field in the search enabling container comprises a chain of links connecting the primary structural container to the structural container containing the underlying field.

Clause 20. One or more computer-readable media having encoded thereon computer-executable instructions causing one or more processors to perform a method comprising:
 receiving a search request for data search in a plurality of database tables;
 in response to the search request, searching the plurality of database tables using a database model; and
 displaying search results;
 wherein the database model comprises a plurality of structural containers and a search enabling container,
 wherein the plurality of structural containers represent objects having a structural relationship and contain property data of the objects, wherein the property data of the objects are obtained from the plurality of database tables, wherein the plurality of structural containers specifies neither a scope of the data search nor a format of the search results, wherein the search enabling container specifies the scope of the data search and the format of the search results,
 wherein the plurality of structural containers comprise respective source table references specifying underlying database tables from which the property data of the objects represented by the plurality of structural containers are obtained,
 wherein the search enabling container comprises a basic container reference which specifies a primary structural container, wherein the primary structural container is one of the plurality of structural containers,
 wherein the search enabling container comprises a list of unified fields, wherein a unified field in the search enabling container corresponds to an underlying field in one of the plurality of structural containers, and
 wherein the unified field in the search enabling container comprises a chain of links connecting the primary structural container to the structural container containing the underlying field.

Clause 21. A method comprising:
 receiving a search request via a computer interface for data search in a plurality of database tables;
 in response to the search request, searching the plurality of database tables using a corresponding database model which specifies a scope of the data search; and
 displaying search results via the computer interface according to a format specified by the database search model;
 wherein the database model comprises a plurality of structural containers and a search enabling container,
 wherein the plurality of structural containers represent objects having a structural relationship and contain property data of the objects, wherein the property data of the objects are obtained from the plurality of database tables, wherein the plurality of structural containers contain no information pertaining to the scope of the data search or the format of the search results,
 wherein the search enabling container specifies the scope of the data search and the format of the search results,
 wherein information about the structural relationship of the objects is separate from the search enabling container.

Example 18—Example Alternatives

The technologies from any example can be combined with the technologies described in any one or more of the other examples. In view of the many possible embodiments to which the principles of the disclosed technology can be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

The invention claimed is:
1. A computer system comprising:
 memory;
 one or more processors coupled to the memory and configured to search data contained in a plurality of database tables; and
 one or more database search models stored in one or more computer readable media, wherein the one or more database search models comprise a plurality of structural containers and one or more search enabling containers, wherein the plurality of structural containers represent objects and contain property data of the objects, wherein the property data of the objects are obtained from the plurality of database tables, wherein the plurality of structural containers comprise respective source table references and lists of links that model a structural relationship between the objects, wherein the one or more search enabling containers have a one-to-one relationship with the one or more database search models, wherein the one or more search enabling containers specify a scope for searching data, wherein the one or more search enabling containers specify a display format defining structure and appearance for presenting search results, wherein the scope for searching data and the display format are excluded from the plurality of structural containers, wherein the source table references and lists of links that model the structural relationship between the objects are excluded from the one or more search enabling containers.

2. The system of claim 1, wherein the respective source table references specify underlying database tables from which the property data of the objects represented by the plurality of structural containers are obtained.

3. The system of claim 2, wherein the plurality of structural containers comprise respective Boolean expressions configured for filtering rows of the underlying database tables.

4. The system of claim 2, wherein the plurality of structural containers comprise respective lists of fields that correspond to respective columns of the underlying database tables.

5. The system of claim 4, wherein a list of links of a selected structural container semantically relates the selected structural container to respective structural containers other than the selected structural container.

6. The system of claim 5, wherein a link of the selected structural container comprises a linking expression specifying a relationship between one or more fields of the selected structural container and one or more fields of one of the structural containers other than the selected structural container, wherein the link is directional.

7. The system of claim 1, wherein a search enabling container selected from the one or more search enabling containers comprises a basic container reference which specifies a primary structural container, wherein the primary structural container is one of the plurality of structural containers.

8. The system of claim 1, wherein the selected search enabling container comprises a list of unified fields, wherein a unified field in the selected search enabling container corresponds to an underlying field in one of the plurality of structural containers.

9. The system of claim 8, wherein the unified field in the selected search enabling container comprises a chain of links connecting the primary structural container to the structural container containing the underlying field.

10. The system of claim 1, wherein data in the plurality of structural containers and one or more search enabling containers are stored in one or more metadata tables.

11. A computer system comprising:
memory;
one or more processors coupled to the memory and configured to search data contained in a plurality of database tables; and
a database search model stored in one or more computer readable media, the database search model comprising:
a plurality of structural containers and a search enabling container,
wherein the plurality of structural containers represent objects and contain property data of the objects, wherein the property data of the objects are obtained from the plurality of database tables,
wherein the plurality of structural containers comprise respective source table references and lists of links that model a structural relationship between the objects,
wherein the search enabling container specifies a scope of the data search, wherein the search enabling container specifies a display format defining structure and appearance for presenting search results,
wherein the scope of the data search and the display format are excluded from the plurality of structural containers,
wherein the source table references and lists of links that model the structural relationship between the objects are excluded from the search enabling container,
wherein the respective source table references specify underlying database tables from which the property data of the objects represented by the plurality of structural containers are obtained.

12. The computer system of claim 11, wherein the plurality of structural containers comprise respective Boolean expressions configured for filtering rows of the underlying database tables.

13. The computer system of claim 11, wherein the plurality of structural containers comprise respective lists of fields that correspond to respective columns of the underlying database tables.

14. The computer system of claim 13, wherein a list of links of a selected structural container semantically relates the selected structural container to respective structural containers other than the selected structural container.

15. The computer system of claim 14, wherein a link of the selected structural container comprises a linking expression specifying a relationship between one or more fields of the selected structural container and one or more fields of one of the structural containers other than the selected structural container, wherein the link is directional.

16. The computer system of claim 11, wherein the search enabling container comprises a basic container reference which specifies a primary structural container, wherein the primary structural container is one of the plurality of structural containers.

17. The computer system of claim 16, wherein the search enabling container comprises a list of unified fields, wherein a unified field in the search enabling container corresponds to an underlying field contained in one of the plurality of structural containers.

18. The computer system of claim 17, wherein the unified field in the search enabling container comprises a chain of links connecting the primary structural container to the one of the plurality of structural containers containing the underlying field.

19. One or more non-transitory computer-readable media having encoded thereon computer-executable instructions causing one or more processors to perform a method comprising:

receiving a search request for data search in a plurality of database tables;

in response to the search request, searching the plurality of database tables using a database model; and displaying search results;

wherein the database model comprises a plurality of structural containers and a search enabling container, wherein the plurality of structural containers represent objects and contain property data of the objects, wherein the property data of the objects are obtained from the plurality of database tables, wherein the plurality of structural containers comprise respective source table references and lists of links that model a structural relationship between the objects, wherein the search enabling container specifies a scope of the data search, wherein the search enabling container specifies a display format defining structure and appearance for presenting search results, wherein the scope of the data search and the display format are excluded from the plurality of structural containers, wherein the source table references and lists of links that model the structural relationship between the objects are excluded from the search enabling container, wherein the plurality of structural containers comprise respective source table references specifying underlying database tables from which the property data of the objects represented by the plurality of structural containers are obtained, wherein the search enabling container comprises a basic container reference which specifies a primary structural container, wherein the primary structural container is one of the plurality of structural containers, wherein the search enabling container comprises a list of unified fields, wherein a unified field in the search enabling container corresponds to an underlying field contained in one of the plurality of structural containers, and wherein the unified field in the search enabling container comprises a chain of links connecting the primary structural container to the one of the plurality of structural containers containing the underlying field.

20. A method comprising:

receiving a search request via a computer interface for data search in a plurality of database tables;

in response to the search request, searching, by one or more processors, the plurality of database tables using a database model which is stored in a computer readable media and specifies a scope of the data search; and displaying search results via the computer interface according to a display format specified by the database search model;

wherein the database search model comprises a plurality of structural containers and a search enabling container, wherein the plurality of structural containers represent objects and contain property data of the objects, wherein the property data of the objects are obtained from the plurality of database tables, wherein the plurality of structural containers comprise respective source table references and lists of links that model a structural relationship between the objects, wherein the search enabling container specifies the scope of the data search, wherein the search enabling container specifies the display format defining structure and appearance for presenting the search results, wherein the scope of the data search and the display format are excluded from the plurality of structural containers, wherein the source table references and lists of links that model the structural relationship between the objects are excluded from the search enabling container, wherein the respective source table references specify underlying database tables from which the property data of the objects represented by the plurality of structural containers are obtained.

* * * * *